(12) United States Patent
Suzuki et al.

(10) Patent No.: US 7,725,876 B2
(45) Date of Patent: May 25, 2010

(54) ORIGINAL CONTENTS CREATION APPARATUS, DERIVED CONTENTS CREATION APPARATUS, DERIVED CONTENTS USING APPARATUS, ORIGINAL CONTENTS CREATION METHOD, DERIVED CONTENTS CREATION METHOD, AND DERIVED CONTENTS USING METHOD AND VERIFICATION METHOD

(75) Inventors: Takashi Suzuki, Yokosuka (JP); Atsushi Takeshita, Yokohama (JP); Hiroshi Fujimoto, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1345 days.

(21) Appl. No.: 11/144,904

(22) Filed: Jun. 6, 2005

(65) Prior Publication Data
US 2005/0273864 A1 Dec. 8, 2005

(30) Foreign Application Priority Data
Jun. 7, 2004 (JP) ............................. 2004-169003

(51) Int. Cl.
G06F 9/44 (2006.01)
G06F 3/00 (2006.01)
(52) U.S. Cl. ...................................... 717/106; 715/723
(58) Field of Classification Search ................. 717/106; 705/27; 713/176; 715/716, 723
See application file for complete search history.

(56) References Cited

U.S. PATENT DOCUMENTS

| | | | |
|---|---|---|---|
| 5,818,439 A * | 10/1998 | Nagasaka et al. | 725/87 |
| 6,389,402 B1 | 5/2002 | Ginter et al. | |
| 6,578,070 B1 * | 6/2003 | Weaver et al. | 709/206 |
| 6,584,463 B2 * | 6/2003 | Morita et al. | 707/3 |
| 6,850,252 B1 * | 2/2005 | Hoffberg | 715/716 |
| 7,167,844 B1 * | 1/2007 | Leong et al. | 705/80 |
| 2001/0051906 A1 * | 12/2001 | Esposito | 705/35 |
| 2001/0056573 A1 | 12/2001 | Kovac et al. | |
| 2002/0194607 A1 * | 12/2002 | Connelly | 725/87 |
| 2003/0023564 A1 | 1/2003 | Padhye et al. | |

(Continued)

FOREIGN PATENT DOCUMENTS

CN 1487456 A 4/2004

(Continued)

OTHER PUBLICATIONS

"The Digital Property Rights Language—Manual and Tutorial -XML Edition-Version 2.00", Xerox Corporation, XP-002333476, Nov. 13, 1998, 100 pages.

*Primary Examiner*—Wei Y Zhen
*Assistant Examiner*—Chih-Ching Chow
(74) *Attorney, Agent, or Firm*—Oblon, Spivak, McClelland, Maier & Neustadt, L.L.P.

(57) ABSTRACT

Disclosed is an original contents creation apparatus realizing a protection of original contents and derived contents in a derived contents distribution by any number of secondary providers. An original contents creation apparatus includes a limitation rule acquisition unit for acquiring a limitation rule of a case of inserting additional secondary contents into original contents, and a joining/signature unit for joining the limitation rule and a first operation rule to the original contents, the first operation rule defining an operation of a case of having detected an insertion of secondary contents violating the limitation rule, and giving an electronic signature to the original contents to which the limitation rule and the first operation rule are joined.

5 Claims, 19 Drawing Sheets

U.S. PATENT DOCUMENTS

| | | |
|---|---|---|
| 2003/0093790 A1 | 5/2003 | Logan et al. |
| 2003/0121037 A1 | 6/2003 | Swix et al. |
| 2003/0177490 A1 | 9/2003 | Hoshino et al. |
| 2003/0236977 A1* | 12/2003 | Levas et al. ................ 713/158 |
| 2004/0003398 A1 | 1/2004 | Donian et al. |
| 2004/0030704 A1* | 2/2004 | Stefanchik et al. .......... 707/100 |
| 2004/0246376 A1* | 12/2004 | Sekiguchi et al. ........... 348/468 |
| 2004/0255150 A1* | 12/2004 | Sezan et al. ................ 713/200 |
| 2005/0060342 A1* | 3/2005 | Farag ........................ 707/102 |
| 2007/0038538 A1* | 2/2007 | Silverbrook et al. .......... 705/35 |

FOREIGN PATENT DOCUMENTS

| | | |
|---|---|---|
| EP | 1 276 035 A2 | 1/2003 |
| JP | 10-512074 | 11/1998 |
| JP | 11-86435 | 3/1999 |
| JP | 2002-049840 | 2/2002 |
| JP | 2003-308249 | 10/2003 |
| JP | 3485911 | 10/2003 |
| JP | 2004-029859 | 1/2004 |
| JP | 2004-70646 | 3/2004 |
| WO | WO 02/35324 A2 | 5/2002 |

\* cited by examiner

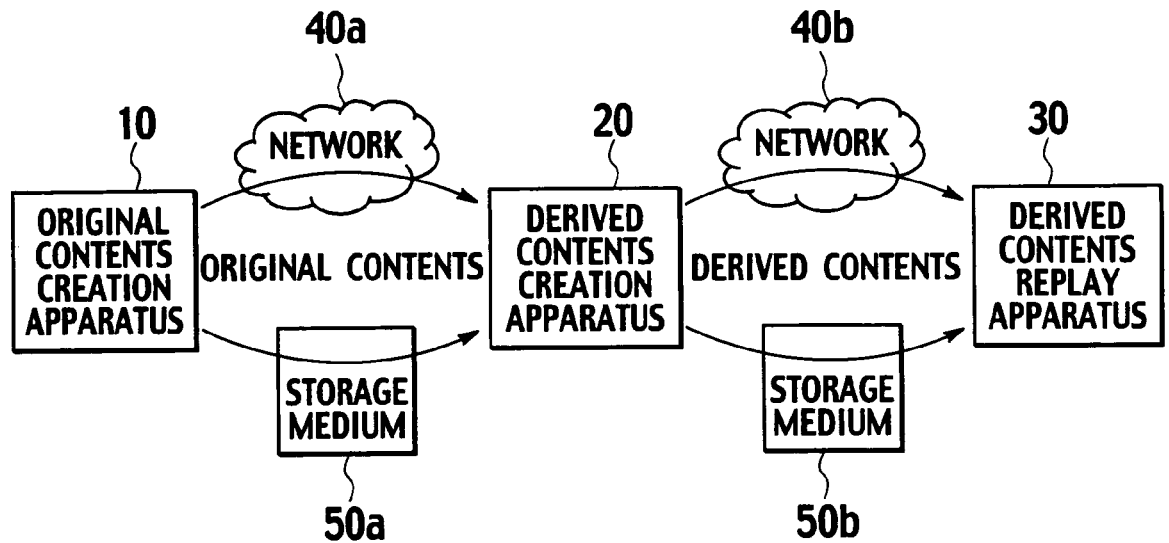
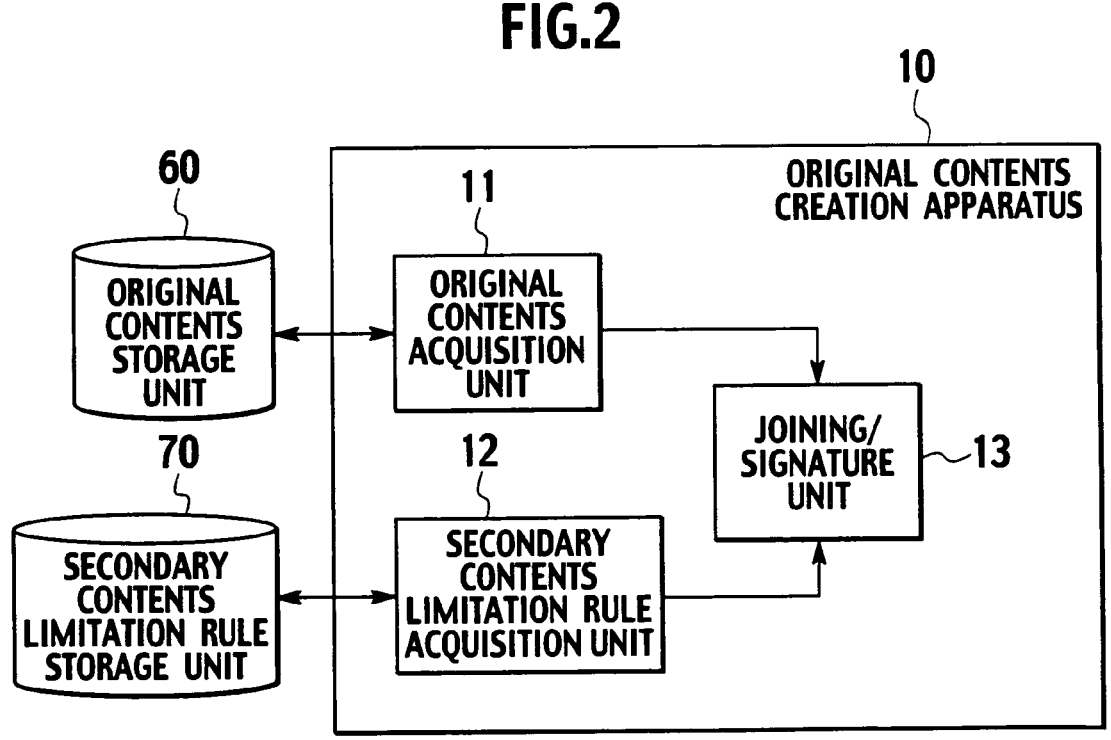

FIG.3

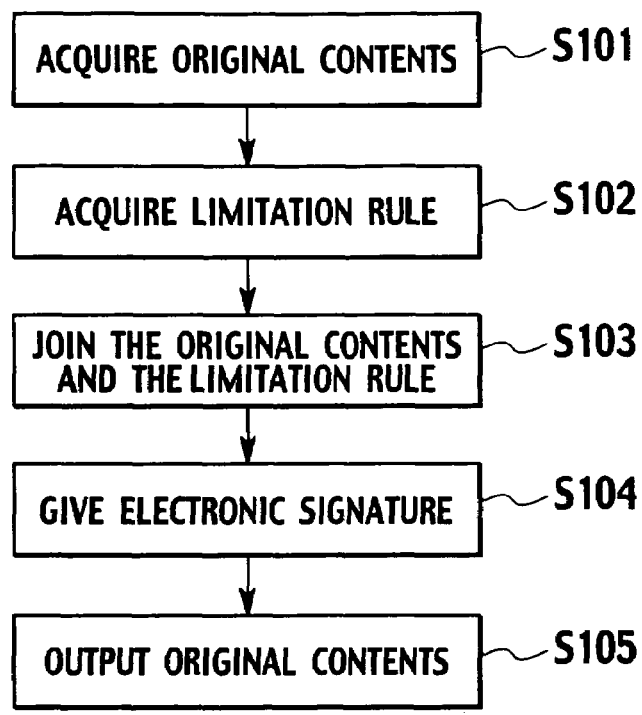

ACQUIRE ORIGINAL CONTENTS — S101

ACQUIRE LIMITATION RULE — S102

JOIN THE ORIGINAL CONTENTS AND THE LIMITATION RULE — S103

GIVE ELECTRONIC SIGNATURE — S104

OUTPUT ORIGINAL CONTENTS — S105

```
<?xml version="1.0"?>
<smil xmlns="http://www.w3.org/2001/SMIL20/Language">
  <head>
    <layout>
      <root-layout background-color="#00CCCC" width="360" height="270"/>
      <region id="content" left="20" top-"15" width="320" height="240"/>
    </layout>
  </head>
  <body>
    <seq>
      <par>
        <video region="content" src="rtsp://tier-1/video1.rm"/>
        <audio src="rtsp://tier-1/audio1.rm"/>
      </par>
    </seq>
  </body>
</smil>
```

FIG.5

```
<Policy xmlns="urn:oasis:names:tc:xacml:1.0:policy"
    ...OMITTED...
  PolicyId="Adaptation" RuleCombiningAlgId="identifier:rule-combining-algorithm:first-
applicable">
<Rule RuleId="1"Effect="Permit">
  <Subjects><Subject>
     <SubjectMatch MatchId="function:string-equal">
          <SubjectAttributeDesignator AttributeId="pid" DataType="xs:string"/>
          <AttributeValue>Provider1</AttributeValue>
     </SubjectMatch>
  <Subject></Subjects>
  <Resources><Resource>
     <ResourceMatch MatchId="function:string-equal">
          <ResourceAttributeDesignator AttributeId="AdaptationTarget" DataType="xs:string"/>
          <AttributeValue>/smil/body/seq/par[2]/video[1]</AttributeValue>
     </ResourceMatch>
  </Resource></Resources>
  <Actions><Action>
     <ActionMatch MatchId="function:regexp-string-match">
          <ActionAttributeDesignator AttributeId="AdaptationAction" DataType="xs:string"/>
          <AttributeValue>add</AttributeValue>
     </ActionMatch>
     <ActionMatch MatchId="function:regexp-string-match">
          <ActionAttributeDesignator AttributeId="region" DataType="xs:string"/>
          <AttributeValue>content</AttributeValue>
     </ActionMatch>
     <ActionMatch MatchId="function:integer-less-than-or-equal">
          <ActionAttributeDesignator AttributeId="dur" DataType="xs:integer"/>
          <AttributeValue>20</AttributeValue>
     </ActionMatch>
     <ActionMatch MatchId="function:regexp-string-match">
          <ActionAttributeDesignator AttributeId="src" DataType="xs:string"/>
          <AttributeValue>rtsp://*</AttributeValue>
          </ActionMatch>
  </Action></Actions>
</Rule>
</Policy>
```

FIG.6

```
<?xml version="1.0"?>
<DocumentRoot>
  <Policy>
    Policy ELEMENT OF FIG. 5
  </Policy>
  <Response>
    FIRST OPERATION RULE
  </Response>
  <Response>
    SECOND OPERATION RULE
  </Response>
  <smil>
    smil ELEMENT OF FIG. 4
  </smil>
  <Signature>
    <Signedinfo>
      <CanonicalizationMethod/>
      <SignatureMethod/>
      <Reference URI=/DocumentRoot/Policy>
        <DigesMethod Algorithm="http://www.w3.org/2000/09/xmldsig#sha1"/>
        <DigestValue> HASH VALUE OF LIMITATION RULE </DigestValue>
      </Reference>
      </Reference URI=/DocumentRoot/Responce>
        <DigesMethod Algorithm="http://www.w3.org/2000/09/xmldsig#sha1"/>
        <DigestValue> HASH VALUE OF FIRST OPERATION RULE </DigestValue>
      </Reference URI=/DocumentRoot/Responce>
        <DigesMethod Algorithm="http://www.w3.org/2000/09/xmldsig#sha1"/>
        <DigestValue> HASH VALUE OF SECOND OPERATION RULE </DigestValue>
      </Reference>
      <Reference URI=/DocumentRoot/smil>
        <DigesMethod Algorithm=http://www.w3.org/2000/09/xmldsig#sha1/>
        <DigestValue> HASH VALUE OF METADATA </DigestValue>
      </Reference>
    </SignedInfo>
    <SignatureValue> SIGNATURE VALUE </SignatureValue>
    <KeyInfo>
      VERIFICATION KEY INFORMATION OF ORIGINAL CONTENTS CREATION APPARATUS
    </KeyInfo>
  </Signature>
</DocumentRoot>
```

FIG.9

```
<par>
    <video dur="20" src="rtsp://tier-2/videoad.rm"/>
</par>
```

FIG.10

```
<?xml version="1.0"?>
<smil xmlns="http://www.w3.org/2001/SMIL20/Language">
    <head>
        <layout>
            <root-layout background-color="#00CCCC"width="360"height="270"/>
            <region id="content"left="20"top="15"width="320"height="240"/>
        </layout>
    </head>
    <body>
        <seq>
            <par>
                <video region="content"src="rtsp://tier-1/video1.rm"/>
                <audio src="rtsp://tier-1/audio1.rm"/>
            </par>
            <par>
                <video region="content"dur="20"src="rtsp://tier-2/videoad.rm"/>
            </par>
        </seq>
    </body>
</smil>
```

```
<?xml version="1.0"?>
<DocumentRoot>
 <Policy>
   Policy ELEMENT OF FIG. 5
 </Policy>
 <Response>
   FIRST OPERATION RULE
 </Response>
 <Response>
   SECOND OPERATION RULE
 </Response>
 <smil>
   smil ELEMENT OF FIG. 4
 </smil>
 <Signature>
   SIGNATURE DATA OF ORIGINAL CONTENTS CREATION APPARATUS
 </Signature>
 <Signature>
   <SignedInfo>
     <CanoninalizationMethod/>
     <SignatureMethod/>
     <Reference URI=/DocumentRoot>
        <DigestMethod Algorithm="http://www.w3.org/2000/09/xmldsig#sha1"/>
        <DigestValue> HASH VALUE OF ORIGINAL CONTENTS </DigestValue>
     </Reference>
   </SignedInfo>
   <SignatureValue> SIGNATURE VALUE </SignatureValue>
   <KeyInfo>
      VERIFICATION KEY INFORMATION OF DERIVED CONTENTS CREATION APPARATUS
   </KeyInfo>
 </Signature>
</DocumentRoot>
```

FIG.12

```
<?xml version="1.0"?>
<DocumentRoot>
 <Policy>
    Policy ELEMENT OF FIG. 5
 </Policy>
 <Response>
    FIRST OPERATION RULE
 </Response>
 <Response>
    SECOND OPERATION RULE
 </Response>
 <Response>
    THIRD OPERATION RULE
 </Response>
 <Response>
    FOURTH OPERATION RULE
 </Response>
 <smil>
    smil ELEMENT OF FIG. 4
 </smil>
 <Signature>
    SIGNATURE DATA OF ORIGINAL CONTENTS CREATION APPARATUS
 </Signature>
 <Signature>
   <SignedInfo>
      <CanoninalizationMethod/>
      <SignatureMethod/>
      <Reference URI=/DocumentRoot>
         <DigestMethod Algorithm="http://www.w3.org/2000/09/xmldsig#sha1"/>
         <DigestValue> HASH VALUE OF ORIGINAL CONTENTS </DigestValue>
      </Reference>
   </SignedInfo>
   <SignatureValue> SIGNATURE VALUE </SignatureValue>
   <KeyInfo>
      VERIFICATION KEY INFORMATION OF DERIVED CONTENTS CREATION APPARATUS
   </KeyInfo>
 </Signature>
</DocumentRoot>
```

262

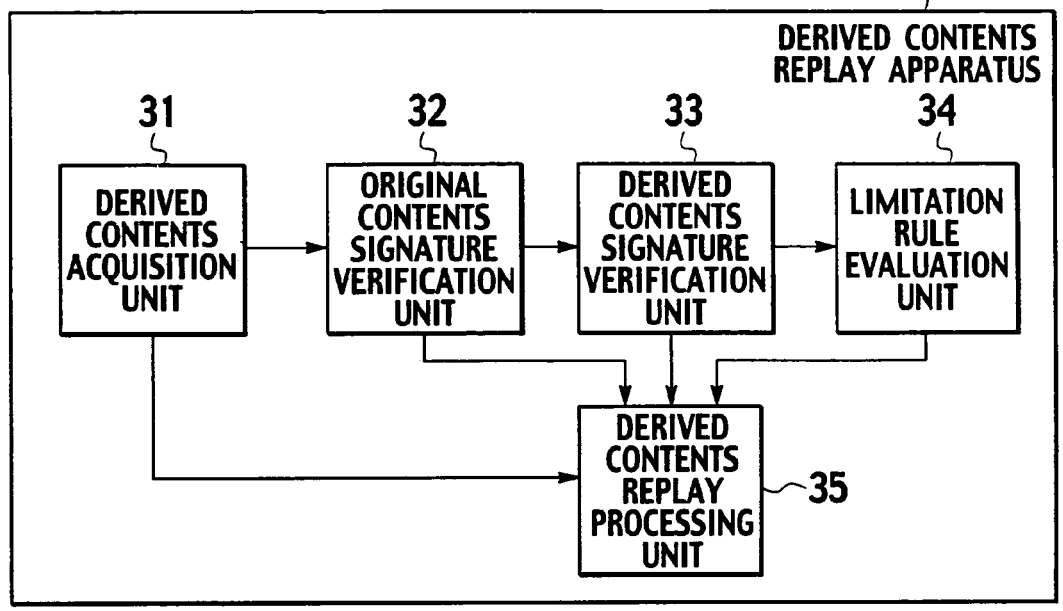
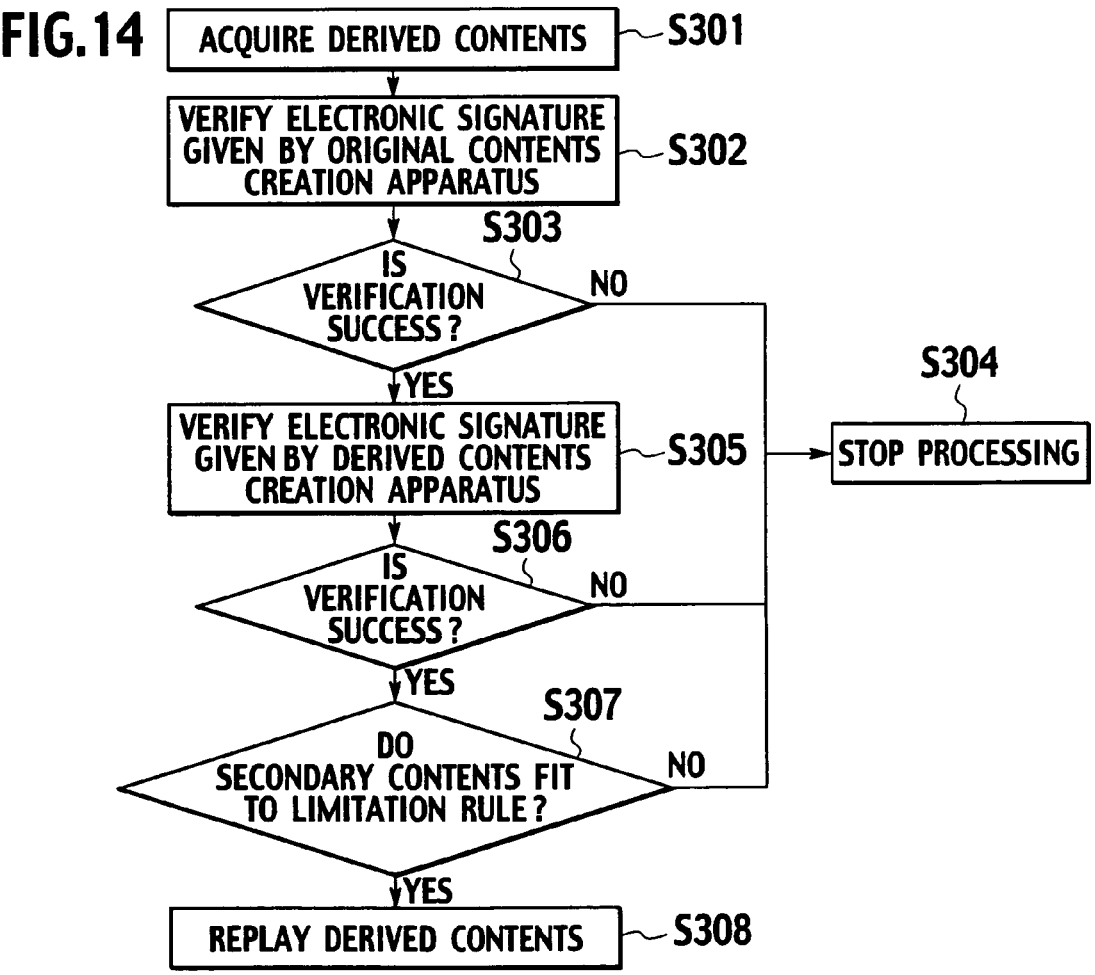

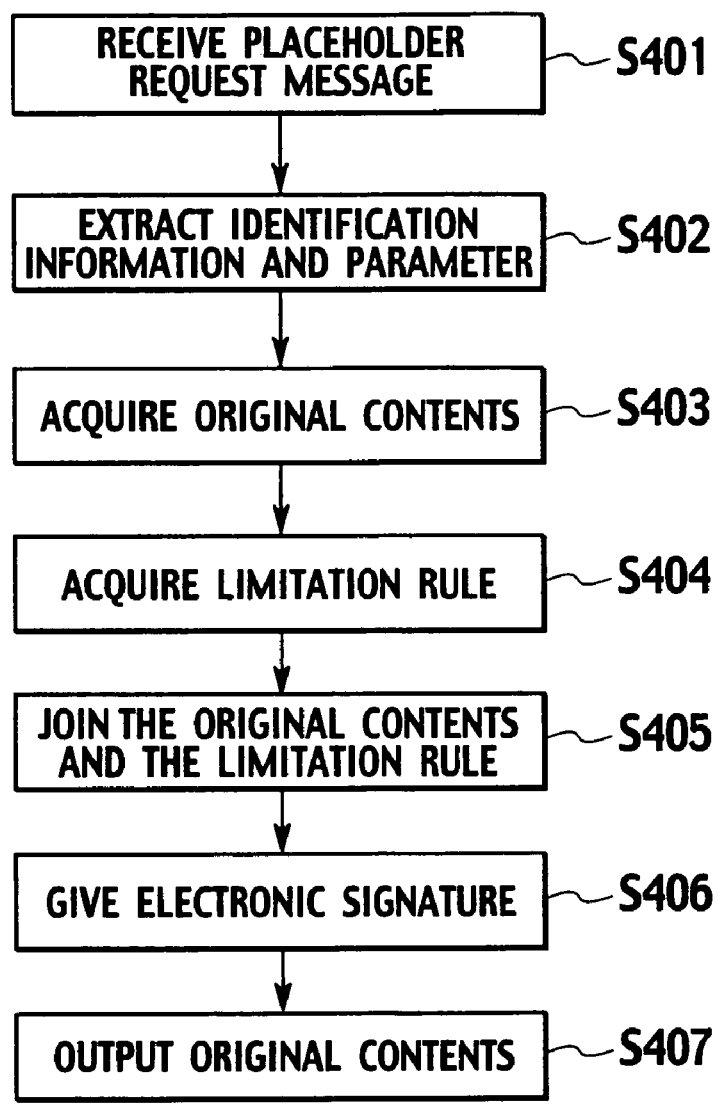

```
<?xml version="1.0"?>
<smil xmlns="http://www.w3.org/2001/SMIL20/Language">
   <head>
      <layout>
         <root-layout background-color="#00CCCC" width="360" height="270"/>
         <region id="content" left="20" top-"15" width="320" height="240"/>
         <region id="ad"left="20"top="10"width="320"height="60"/>
      </layout>
   </head>
   <body>
      <seq>
         <par>
            <video region="content"src="rtsp://tier-1/video1.rm"/>
            <audio src="rtsp://tier-1/audio1.rm"/>
         </par>
         <par>
            <video region="ad"phid="1"src=""/>
            <video region="content" src="rtsp://tier-1/video2.rm"/>
         </par>
      </seq>
   </body>
</smil>
```

```xml
<Policy xmlns="urn:oasis:names:tc:xacml:1.0:policy"
   ···OMITTED···
  PolicyId="Adaptation" RuleCombiningAlgId="identifier:rule-combining-algorithm:first-applicable">
<Rule RuleId="1"Effect="Permit">
  <Subjects><Subject>
     <SubjectMatch MatchId="function:string-equal">
         <SubjectAttributeDesignator AttributeId="pid" DataType="xs:string"/>
         <AttributeValue>Provider1</AttributeValue>
     </SubjectMatch>
  <Subject></Subjects>
  <Resources><Resource>
     <ResourceMatch MatchId="function:string-equal">
         <ResourceAttributeDesignator AttributeId="AdaptationTarget" DataType="xs:string"/>
         <AttributeValue>/smil/body/seq/par[2]/video[1]</AttributeValue>
     </ResourceMatch>
     <ResourceMatch MatchId="function:string-equal">
         <ResourceAttributeDesignator AttributeId="phid"DataType="xs.string"/>
         <AttributeValue>1</AttributeValue>
     </ResourceMatch>
  </Resource></Resources>
  <Actions><Action>
     <ActionMatch MatchId="function:regexp-string-match">
         <ActionAttributeDesignator AttributeId="AdaptationAction" DataType="xs:string"/>
         <AttributeValue>add</AttributeValue>
     </ActionMatch>
     <ActionMatch MatchId="function:regexp-string-match">
         <ActionAttributeDesignator AttributeId="region" DataType="xs:string"/>
         <AttributeValue>ad</AttributeValue>
         </ActionMatch>
     <ActionMatch MatchId="function:integer-less-than-or-equal">
         <ActionAttributeDesignator AttributeId="dur" DataType="xs:integer"/>
         <AttributeValue>20</AttributeValue>
     </ActionMatch>
     <ActionMatch MatchId="function:regexp-string-match">
         <ActionAttributeDesignator AttributeId="src" DataType="xs:string"/>
         <AttributeValue>rtsp://*</AttributeValue>
         </ActionMatch>
  </Action></Actions>
</Rule>
</Policy>
```

```
<?xml version="1.0"?>
<DocumentRoot>
 <Policy>
   Policy ELEMENT OF SECONDARY CONTENTS LIMITATION RULE 1121
 </Policy>
 <Response>
   FIRST OPERATION RULE
 </Response>
 <smil>
   smil ELEMENT OF ORIGINAL CONTENTS 1111
 </smil>
 <Signature>
   <SignedInfo>
     <CanonicalizationMethod/>
     <SignatureMethod/>
     </Reference URI=/DocumentRoot/Policy>
       <DigestMethod Algorithm="http://www.w3.org/2000/09/xmldsig#sha1"/>
       <DigestValue> HASH VALUE OF LIMITATION RULE </DigestValue>
     </Reference >
     <Reference URI=/DocumentRoot/Response>
       <DigestMethod Algorithm="http://www.w3.org/2000/09/xmldsig#sha1"/>
       <DigestValue> HASH VALUE OF FIRST OPERATION RULE </DigestValue>
     </Reference >
     <Reference URI=/DocumentRoot/smil>
       <DigestMethod Algorithm="http://www.w3.org/2000/09/xmldsig#sha1"/>
       <DigestValue> HASH VALUE OF METADATA </DigestValue>
     </Reference >
     <SecondaryContentParameter>
         DERIVED CONTENTS CORRECTNESS PARAMETER
     </SecondaryContentParameter>
   </SignedInfo>
 </SignatureValue> ORIGINAL CONTENTS SIGNATURE VALUE </SignatureValue>
   <KeyInfo>
       VERIFICATION KEY INFORMATION OF ORIGINAL CONTENTS CREATION APPARATUS
   </KeyInfo>
 </Signature>
<DocumentRoot>
```

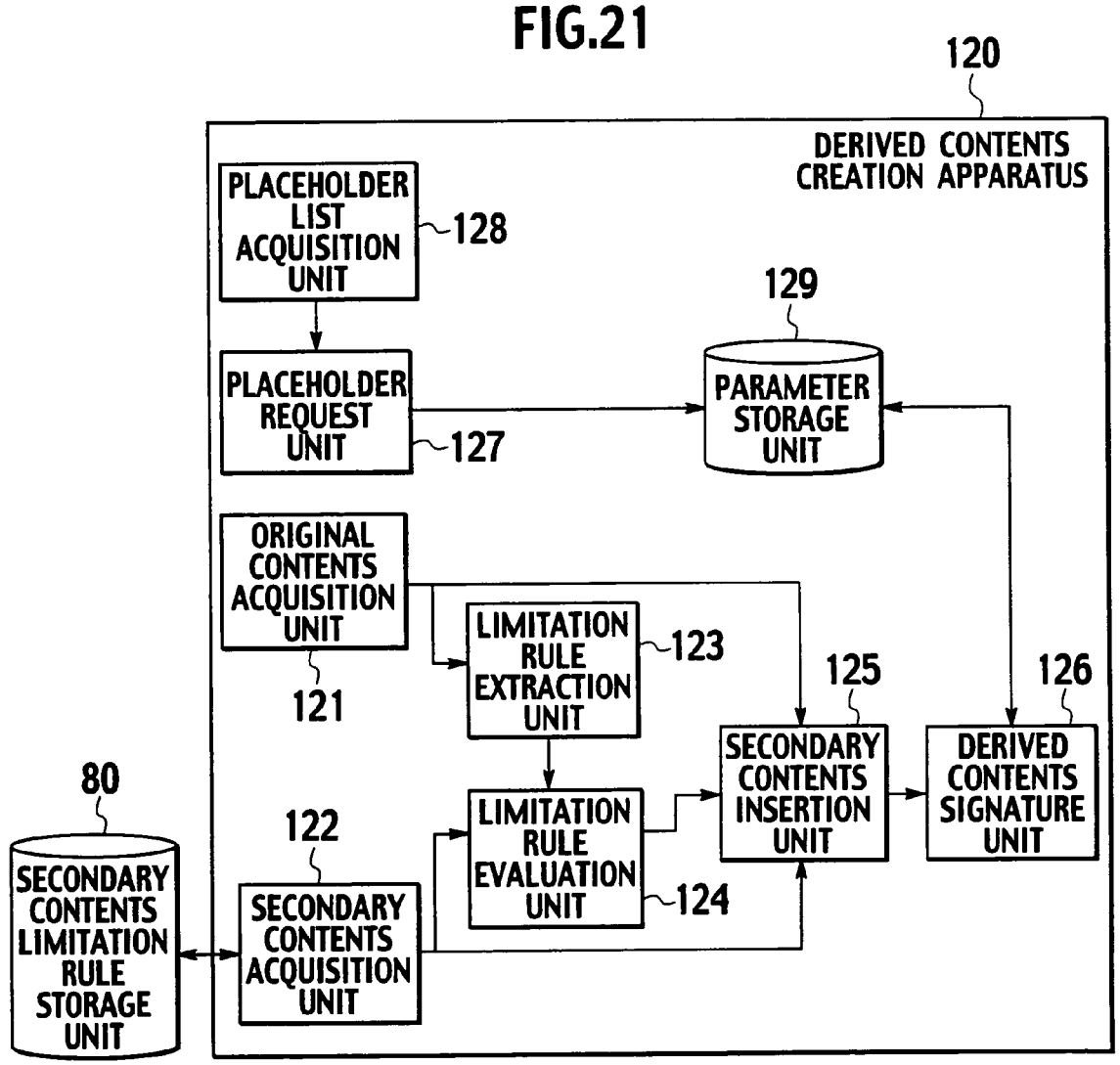

FIG.24

```
<?xml version="1.0"?>
<sml xmlns="http://www.w3.org/2001/SMIL20/Language">
  <head>
    <layout>
      <root-layout background-color="#00CCCC" width="360" height="270"/>
      <region id="content" left="20" top="15" width="320" height="240"/>
      <region id="ad" left="20" top="10" width="320" height="60"/>
    </layout>
  </head>
  <body>
    <seq>
      <par>
        <video region="content" src="rtsp://tier-1/video1.rm/>
        <audio src="rtsp://tier-1/audio1.rm"/>
      </par>
      <par>
        <video region="ad" phid="1" src="rtsp://tier-2/videoad.rm"/>
        <video region="content" src="rtsp://tier-1/video2.rm"/>
      </par>
    </seq>
  </body>
<smil>
```

```
<?xml version="1.0"?>
<DocumentRoot>
 <Policy>
   Policy ELEMENT OF SECONDARY CONTENTS LIMITATION RULE 1121
 </Policy>
 <Response>
   FIRST OPERATION RULE
 </Response>
 <smil>
   smil ELEMENT OF DERIVED CONTENTS 1251
 </smil>
 <Signature>
   SIGNATURE DATA OF ORIGINAL CONTENTS CREATION APPARATUS
 </Signature>
 <Signature>
   <SignedInfo>
     <CanonicalizationMethod/>
     <Signature Method/>
     <Reference URI=/DocumentRoot>
       <DigestMethod Algorithm="http://www.w3org/2000/09xmldsig#sha1"/>
       <DigestValue> HASH VALUE OF ORIGINAL CONTENTS </DigestValue>
     </Reference>
   </SignedInfo>
   <SignatureValue> SIGNATURE VALUE </SignatureValue>
   <KeyInfo>
      VERIFICATION KEY INFORMATION OF DERIVED CONTENTS CREATION APPARATUS
   </KeyInfo>
 </Signature >
</DocumentRoot>
```
~1261

FIG.26

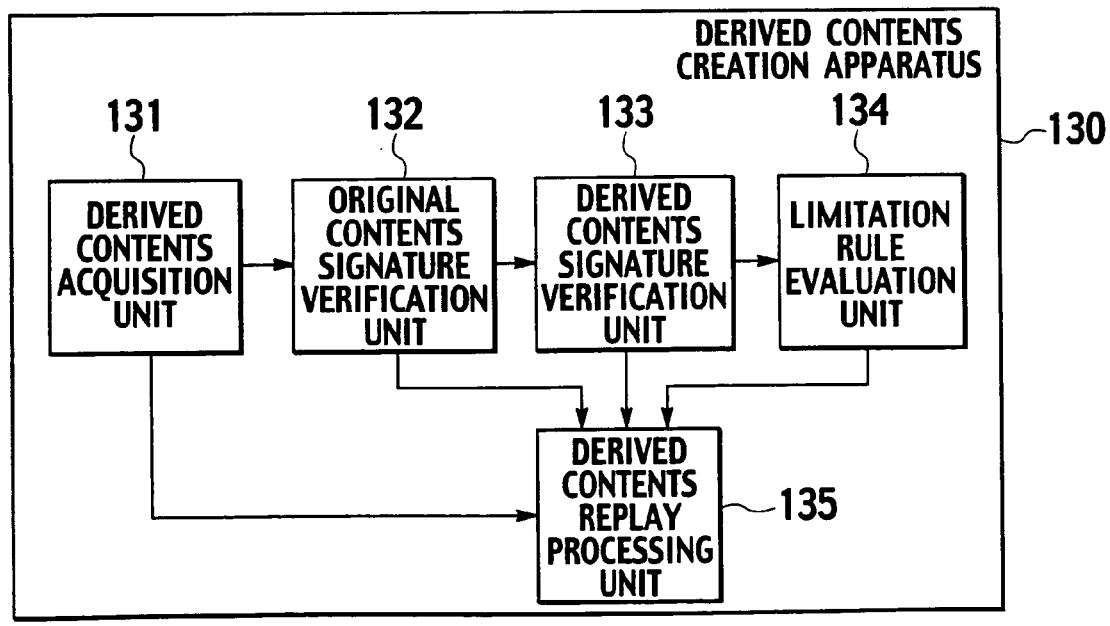

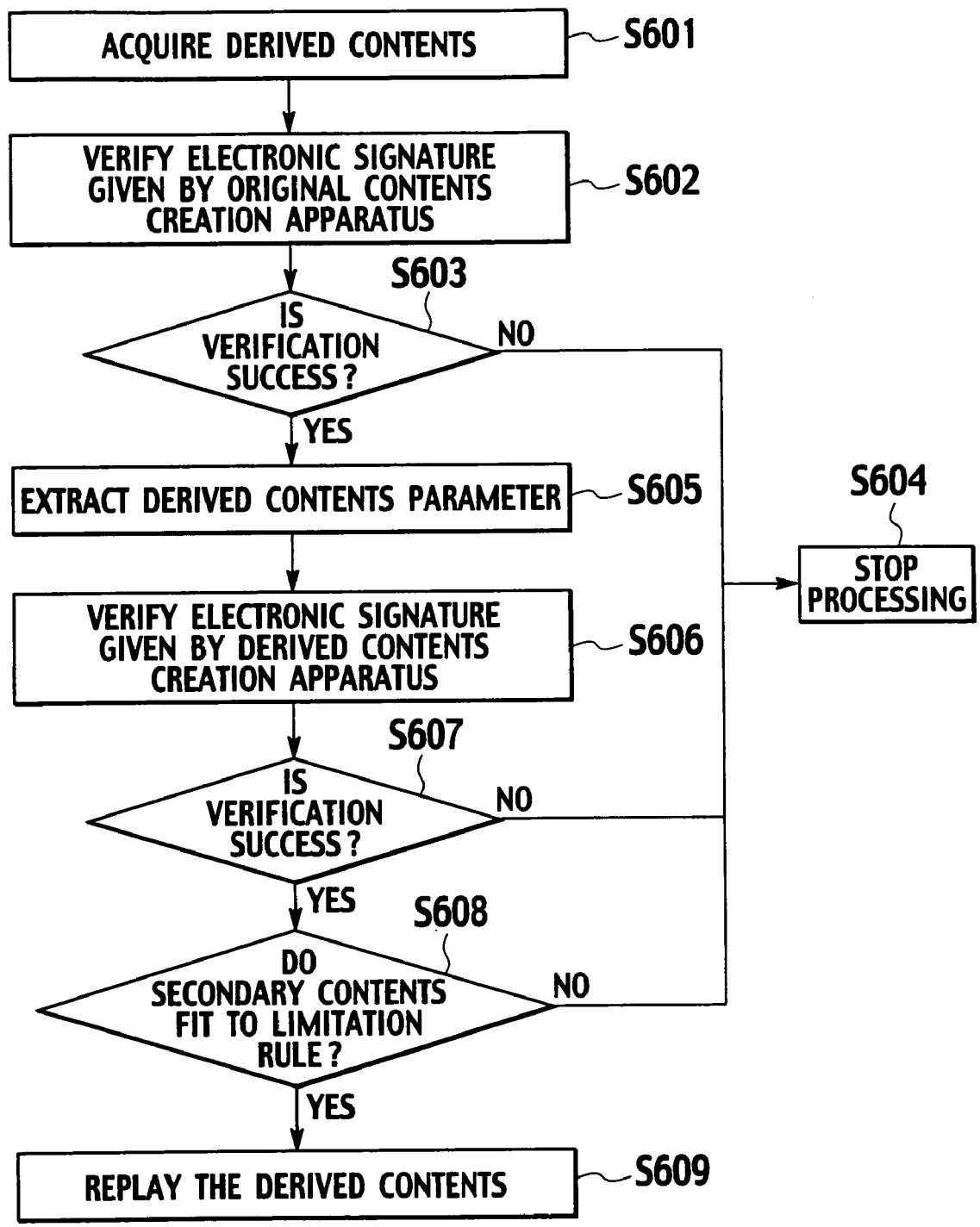

ORIGINAL CONTENTS CREATION APPARATUS, DERIVED CONTENTS CREATION APPARATUS, DERIVED CONTENTS USING APPARATUS, ORIGINAL CONTENTS CREATION METHOD, DERIVED CONTENTS CREATION METHOD, AND DERIVED CONTENTS USING METHOD AND VERIFICATION METHOD

CROSS REFERENCE TO RELATED APPLICATIONS

This application is based upon and claims the benefit of priority from prior Japanese Patent Application P2004-169003 filed on Jun. 7, 2004; the entire contents of which are incorporated by reference herein.

BACKGROUND OF THE INVENTION

1. Field of the Invention

The present invention relates to an original contents creation apparatus, a derived contents creation apparatus, a derived contents using apparatus, an original contents creation method, a derived contents creation method, and derived contents using method and verification method.

2. Description of the Related Art

In a contents distribution system on the Internet, it is necessary to protect contents from unauthorized use and tamper. As such a technology for protecting the contents, for example, disclosed has been a technology for protecting the contents by integrating the contents and a use rule together as a package, and then to make a digital signature on the package and encode the package concerned (for example, refer to Japanese Patent Publication No. H10-512074 (published in 1998)). However, such an existing contents protection technology is on the premise of end-to-end protection, and has eliminated an addition of secondary contents on a distribution path between an original contents provider and an end user.

In the field of broadcasting, a model is established, in which a local station purchases original contents provided by a key station, and inserts an advertisement suitable for a region covered by the local station. This model has a merit for the key station in that it becomes easy to recover an expense of producing the original contents by effective use thereof, and has a merit for the local station in that an increase of advertisement income can be expected by redistributing the high-quality contents produced by the key station.

It is conceivable that a similar model to the above is realized in contents distribution on the Internet to expand a use range of the original contents, thus making it possible to contribute to an expansion of profit resources of an original contents provider and to a service improvement of a secondary provider. A contents distribution system that permits the secondary provider to add the secondary contents is hereinafter referred to as a "derived contents distribution system".

As an aspect of realizing the derived contents distribution system, there is a model of completely entrusting the secondary provider to add the secondary contents and protect the derived contents. In this model, the secondary provider acquires the original contents through a safe communication path, adds the secondary contents thereto, and then gives an appropriate protection to derived contents thus formed, and distributes the contents concerned to the end user. This model is premised on a complete relationship of trust between the original contents provider and the secondary contents provider, and is established only when it is reliable that the secondary provider abides by a condition to be met by the secondary contents and a condition to protect the original contents, and so on.

From a viewpoint of expanding the use of the contents, desirable is a derived contents distribution system that permits the insertion of the secondary contents not only by the specific reliable secondary provider but also by any number of secondary providers. However, establishing the relationship of trust, which is as described above, with any number of secondary providers lacks in scalability. Moreover, when unauthorized derived contents or contents that are not appropriately protected are distributed, it becomes difficult to pursue a secondary provider causing such an inappropriate distribution.

Meanwhile, the secondary provider requires a function to prevent the secondary contents from being removed from the derived contents in an unauthorized manner. For example, such a situation must be avoided, where advertisement contents and a sponsor name, which are added as the secondary contents, are deleted on the distribution path, and the user can watch and listen to only the original contents.

Further, in regard to the contents, there is disclosed a method for setting a limitation rule to add a control over the use of the contents (for example, refer to Japanese Patent No. 3485911). However, in this method, it is difficult to perform a correctness verification of the modified contents (the secondary contents) and the limitation rule.

SUMMARY OF THE INVENTION

In this connection, considering the above-described subject, it is an object of the present invention to provide an original contents creation apparatus, a derived contents creation apparatus, a derived contents using apparatus, an original contents creation method, a derived contents creation method, and derived contents using method and verification method, which realize the protection of the original contents and the derived contents in derived contents distribution by any number of secondary providers.

In order to achieve the above-described object, a first feature of the present invention is summarized to be an original contents creation apparatus for creating original contents, including: (A) a limitation rule acquisition unit configured to acquire a limitation rule of a case of inserting additional secondary contents into the original contents; (B) a joining unit configured to join the limitation rule and a first operation rule to the original contents, the first operation rule defining an operation of a case of having detected an insertion of secondary contents violating the limitation rule; and (C) a signature unit configured to give an electronic signature to the original contents to which the limitation rule and the first operation rule are joined.

According to the contents creation apparatus in accordance with the first feature, the limitation rule is joined to the original contents, thus making it possible to realize a protection of the original contents and the derived contents in the derived contents distribution by any number of secondary providers.

Moreover, the contents creation apparatus according to the first feature may further include: a first receiving unit configured to receive a parameter from an apparatus for inserting the secondary contents into the original contents, the parameter being necessary for correctness verification of derived contents into which the secondary contents are inserted, wherein the joining unit may further join the parameter to the original contents. According to this contents creation apparatus, the parameter can be prevented from being tampered after the derived contents are crated. Hence, the correctness verification of the derived contents can be ensured more.

Furthermore, in the contents creation apparatus according to the first feature, the original contents may contain a placeholder for designating an insertion place of the secondary contents, and the original contents creation apparatus may further include: a second receiving unit configured to receive a placeholder request containing identification information of the placeholder from the apparatus for inserting the secondary contents into the original contents. According to this contents creation apparatus, the apparatus (secondary provider) for inserting the secondary contents can request a specific placeholder.

A second feature of the present invention is summarized to be a derived contents creation apparatus for inserting additional secondary contents into original contents, thereby creating derived contents, including: (A) a limitation rule extraction unit configured to extract a limitation rule of a case of inserting the secondary contents, the limitation rule being contained in the original contents; (B) a secondary contents insertion unit configured to insert the secondary contents into the original contents when the secondary contents fit to the limitation rule; and (C) a derived contents signature unit configured to give an electronic signature to the derived contents.

According to the derived contents creation apparatus in accordance with the second feature, the secondary contents that fit to the limitation rule are inserted, thus making it possible to realize the protection of the original contents and the derived contents in the derived contents distribution by any number of secondary providers. Moreover, the electronic signature is given to the derived contents, thus making it possible to detect the tamper to the secondary contents.

Moreover, the derived contents creation apparatus according to the second feature may further include: a first transmission unit configured to transmit, to an apparatus for creating the original contents, a parameter necessary for correctness verification of the derived contents into which the secondary contents are inserted, wherein the derived contents signature unit may give the electronic signature by using an algorithm and a signature key which correspond to the parameter. According to this derived contents creation apparatus, the parameter can be contained in the signature for the original contents, and accordingly, the parameter can be protected from the tamper. Therefore, the correctness verification of the derived contents containing the secondary contents can be ensured more.

Furthermore, the derived contents creation apparatus according to the second feature may further include: a second transmission unit configured to designate, to the original contents, a placeholder for inserting the secondary contents thereinto, and transmit a placeholder request containing identification information of the placeholder to the apparatus for creating the original contents, wherein the secondary contents insertion unit may insert the secondary contents into the placeholder. According to this derived contents creation apparatus, the place where the secondary contents are inserted into the original contents can be requested beforehand.

A third feature of the present invention is summarized to be a derived contents using apparatus for using derived contents formed by inserting additional secondary contents into original contents, including: (A) a derived contents using unit configured to decide processing of the derived contents based on a first verification result of an electronic signature by an apparatus that has created the original contents, a second verification result of an electronic signature by an apparatus that has inserted the secondary contents, and a fitness result of the secondary contents to a limitation rule of a case of inserting the secondary contents, the limitation rule being contained in the original contents. Here, the "derived contents using apparatus" refers to an apparatus for using the derived contents in some way, such as copying the derived contents, as well as an apparatus for replaying the derived contents.

According to the contents using apparatus in accordance with the third feature, the processing is performed based on the verification results of the signatures and the fitness result with respect to the limitation rule, thus making it possible to realize the protection of the original contents and the derived contents in the derived contents distribution by any number of secondary providers. Specifically, the origins and correctnesses of the original contents and the derived contents can be verified.

Moreover, the derived contents using unit of the derived contents using apparatus according to the third feature: may interrupt replay processing of the derived contents when either the first verification result or the second verification result is a failure; may process the derived contents according to a first operation rule defining an operation of a case of having detected an insertion of secondary contents violating the limitation rule when the secondary contents do not fit to the limitation rule, the first operation rule being described in the original contents; and may use the derived contents when the first verification result and the second verification result are successes and the secondary contents fit to the limitation rule. According to this contents using apparatus, in the case of having received unauthorized contents or tampered contents, use thereof can be stopped. Moreover, an appropriate operation is performed according to the operation rules, and accordingly, a user of the contents can be protected from the unauthorized contents. Moreover, the unauthorized derived contents can be prevented from being used, thus making it possible to protect the original contents.

A fourth feature of the present invention is summarized to be an original contents creation method for creating original contents, including: (A) acquiring a limitation rule of a case of inserting additional secondary contents into the original contents; (B) joining the limitation rule and a first operation rule to the original contents, the first operation rule defining an operation of a case of having detected an insertion of secondary contents violating the limitation rule; and (C) giving an electronic signature to the original contents to which the limitation rule and the first operation rule are joined.

According to the contents creation method in accordance with the fourth feature, the limitation rule is joined to the original contents, thus making it possible to realize the protection of the original contents and the derived contents in the derived contents distribution by any number of secondary providers.

A fifth feature of the present invention is summarized to be a derived contents creation method for inserting additional secondary contents into original contents, thereby creating derived contents, including: (A) extracting a limitation rule of a case of inserting the secondary contents, the limitation rule being contained in the original contents; (B) inserting the secondary contents into the original contents when the secondary contents fit to the limitation rule; and (C) giving an electronic signature to the derived contents.

According to the derived contents creation method in accordance with the fifth feature, the secondary contents that fit to the limitation rule are inserted, thus making it possible to realize the protection of the original contents and the derived contents in the derived contents distribution by any number of secondary providers. Moreover, the electronic signature is given to the derived contents, thus making it possible to detect the tamper to the secondary contents.

A sixth feature of the present invention is summarized to be a derived contents using method for using derived contents formed by inserting additional secondary contents into original contents, including: (A) deciding processing of the derived contents based on a first verification result of an electronic signature by an apparatus that has created the original contents, a second verification result of an electronic signature by an apparatus that has inserted the secondary contents, and a fitness result of the secondary contents to a limitation rule of a case of inserting the secondary contents, the limitation rule being contained in the original contents.

According to the contents using method in accordance with the sixth feature, the processing is performed based on the verification results of the signatures and the fitness result with respect to the limitation rule, thus making it possible to realize the protection of the original contents and the derived contents in the derived contents distribution by any number of secondary providers. Specifically, the origins and correctnesses of the original contents and the derived contents can be verified.

A seventh feature of the present invention is summarized to be a verification method for verifying derived contents formed by inserting additional secondary contents into original contents, including: (A) acquiring a limitation rule of a case of inserting the additional secondary contents into the original contents; (B) joining the limitation rule and a first operation rule to the original contents, the first operation rule defining an operation of a case of having detected an insertion of secondary contents violating the limitation rule; (C) giving a first electronic signature to the original contents to which the limitation rule and the first operation rule are joined; (D) extracting the limitation rule contained in the original contents; (E) inserting the secondary contents into the original contents when the secondary contents fit to the limitation rule; (F) giving a second electronic signature to the derived contents; and (G) deciding processing of the derived contents based on a verification result of the first electronic signature, a verification result of the second electronic signature, and a fitness result of the secondary contents to the limitation rule.

According to the verification method in accordance with the seventh feature, the protection of the original contents and the derived contents can be realized in the derived contents distribution by any number of secondary providers.

According to the present invention, there can be provided the original contents creation apparatus, the derived contents creation apparatus, the derived contents using apparatus, the original contents creation method, the derived contents creation method, and the derived contents using method and verification method, which realize the protection of the original contents and the derived contents in the derived contents distribution by any number of secondary providers.

BRIEF DESCRIPTION OF THE DRAWINGS

FIG. 1 is a configuration block diagram of a derived contents distribution system according to a first embodiment.

FIG. 2 is a configuration block diagram of an original contents creation apparatus according to the first embodiment.

FIG. 3 is a flowchart showing an original contents creation method according to the first embodiment.

FIG. 4 is an example of original contents according to the first embodiment.

FIG. 5 is an example of a secondary contents limitation rule according to the first embodiment.

FIG. 6 is an example of derived contents added with an electronic signature according to the first embodiment.

FIG. 9 is an example of secondary contents according to the first embodiment.

FIG. 10 is an example of derived contents according to the first embodiment.

FIG. 11 is an example of the derived contents added with a signature according to the first embodiment (No. 1).

FIG. 12 is an example of the derived contents added with the signature according to the first embodiment (No. 2).

FIG. 13 is a configuration block diagram of a derived contents replay apparatus according to the first embodiment.

FIG. 14 is a flowchart showing a derived contents replay method according to the first embodiment.

FIG. 17 is a flowchart showing an original contents creation method according to the second embodiment.

FIG. 18 is an example of original contents according to the second embodiment.

FIG. 19 is an example of a secondary contents limitation rule according to the second embodiment.

FIG. 20 is an example of derived contents added with an electronic signature according to the second embodiment.

FIG. 21 is a configuration block diagram of a derived contents creation apparatus according to the second embodiment.

FIG. 24 is an example of derived contents according to the second embodiment.

FIG. 25 is an example of the derived contents added with a signature according to the second embodiment.

FIG. 26 is a configuration block diagram of a derived contents replay apparatus according to the second embodiment.

FIG. 27 is a flowchart showing a derived contents replay method according to the second embodiment.

DETAILED DESCRIPTION OF THE EMBODIMENTS

Figure 7:
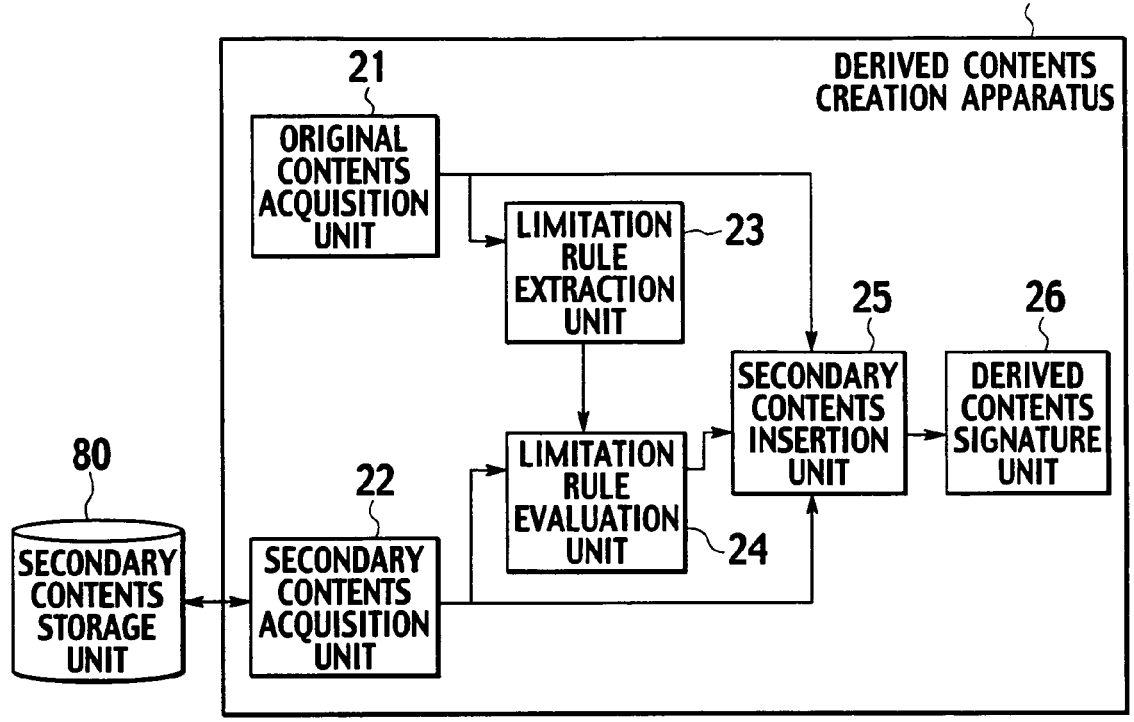
FIG. 7 is a configuration block diagram according to a derived contents creation apparatus according to the first embodiment.

Next, embodiments of the present invention will be described with reference to the drawings. In the description below with reference to the drawings, the same or similar numerals are assigned to the same or similar portions. It should be noted that the drawings are schematic.

First and second embodiments describe a derived contents distribution system that realizes protection of original contents and derived contents by an original contents creation apparatus (original provider), a derived contents creation apparatus (secondary provider), and a derived contents replay apparatus. Here, the "original contents" are contents provided by the original contents provider and the like, the "secondary contents" are additional contents such as an advertisement inserted into the original contents by the secondary provider, and the "derived contents" are contents in a state where the secondary contents are inserted into the original contents.

First Embodiment (Derived Contents Distribution System)

As shown in FIG. 1, the derived contents distribution system according to the embodiments of the present invention includes an original contents creation apparatus 10, a derived contents creation apparatus 20, and derived contents replay apparatus 30. The original contents creation apparatus 10 creates the original contents, and transmits the created original contents to the derived contents creation apparatus 20. The derived contents creation apparatus 20 inserts the secondary contents into the original contents, and transmits the derived contents outputted therefrom to the derived contents replay apparatus 30. The derived contents replay apparatus 30 replays the received derived contents.

The original contents are transmitted through a communication network (Internet or the like) 40a or a storage medium 50a (compact disc, memory card, flexible disk or the like). In a similar way, the derived contents are transmitted through a communication network (Internet or the like) 40b or a storage medium 50b (compact disc, memory card, flexible disk or the like).

Next, description will be made of detailed configurations and operations of the original contents creation apparatus 10, the derived contents creation apparatus 20 and the derived contents replay apparatus 30.

(Original Contents Creation Apparatus and Method)

As shown in FIG. 2, the original contents creation apparatus 10 includes an original contents acquisition unit 11, a secondary contents limitation rule acquisition unit 12, and a joining/signature unit 13, and is connected to an original contents storage unit 60 and a secondary contents limitation rule storage unit 70.

The original contents storage unit 60 stores the original contents. The original contents may be media data including encoded audio and video information, or information (metadata) for the media data. The description below will be made while assuming that the original contents are treated as the metadata; however, a similar protection technology may also be applied to the media data. FIG. 4 is, as an example of the original contents 111, metadata described by using a scene description language SMIL (synchronized multimedia integration language, refer to W3C SMIL2.0, http://www.w3.org/TR/smil20/) for multimedia contents. In this metadata, access information to the media data and arrangement information of the media data when being replayed are described.

The secondary contents limitation rule storage unit 70 stores a limitation rule of the case of inserting the secondary contents into the original contents. FIG. 5 shows an example of a limitation rule 121 described by using XACML (refer to OASIS XACML, http://www.oasis-open.org/committees/tc_home.php/wg_abbrev=xacml), which is an access control markup language to an XML base. FIG. 5 shows a rule to add a second par element under command of a first seq element to the metadata shown in FIG. 4 and to enable a 20-second video streaming accessible according to the RTSP to be added thereinto. Note that, by defining appropriate attribute names, it is possible to designate not only a media type, a replay time and protocol for use but also attribute information such as an image size and an age restriction, as feature quantities to be met by the secondary contents.

The original contents acquisition unit 11 acquires the original contents from the original contents storage unit 60.

The secondary contents limitation rule acquisition unit 12 (limitation rule acquiring means) acquires the limitation rule from the secondary contents limitation rule storage unit 70. Moreover, the secondary contents limitation rule acquisition unit 12 acquires a first operation rule that defines an operation of the case where the secondary contents violate the limitation rule. Furthermore, the secondary contents limitation rule acquisition unit 12 acquires a second operation rule that defines an operation of the case where the insertion of the secondary contents violating the limitation rule has not been detected.

The joining/signature unit 13 (joining means and signature means) joins the metadata and the secondary content limitation rule, which are described above, to each other, and gives an electronic signature thereto. In FIG. 6, a smil element of the original contents 111 and a Policy element of the limitation rule 121 are continuously joined to each other, and an XML signature is given to an XML document formed by such joining (refer to W3C XML-Signature, http://www.w3.org/TR/xmldsig-core).

Note that, though the signature is given to the document formed by continuously joining the limitation data to the metadata in this embodiment, only a hash value of the limitation rule may be contained in a signature element (signedinfo) for the metadata, and an entity of the limitation rule may be distributed separately from the metadata.

Next, an original contents creation method will be described by using FIG. 3.

(A) First, in Step S101, the original contents acquisition unit 11 acquires the original contents from the original contents storage unit 60. Meanwhile, in Step S102, the secondary contents limitation rule acquisition unit 12 acquires the secondary contents limitation rule from the secondary contents limitation rule storage unit 70. Moreover, the secondary contents limitation rule acquisition unit 12 acquires the first operation rule that defines the operation of the case where the secondary contents violate the limitation rule and a second operation rule of the case where the secondary contents do not violate the limitation rule.

(B) Next, in Step S103, the joining/signature unit 13 joins the original contents and the secondary contents limitation rule. Specifically, as shown in FIG. 6, the joining/signature unit 13 continuously joins the smil element of the original contents 111 and the Policy element of the limitation rule 121, and joins the first operation rule (Response element) and the second operation rule (Response element) to each other.

(C) Next, in Step S104, the joining/signature unit 13 gives the signature to the original contents to which the secondary contents limitation rule is joined. For example, as shown in FIG. 6, to the original contents, the joining/signature unit 13 gives hash values of the limitation rule, the first operation rule, the second operation rule and the metadata (original contents), and gives a signature value and verification key information of the original contents creation apparatus.

(D) Then, in Step S105, the joining/signature unit 13 outputs the original contents added with the electronic signature. The outputted original contents added with the electronic signature are transmitted to the derived contents creation apparatus 20.

(Derived Contents Creation Apparatus and Method)

As shown in FIG. 7, the derived contents creation apparatus 20 includes an original contents acquisition unit 21, a secondary contents acquisition unit 22, a limitation rule extraction unit 23, a limitation rule evaluation unit 24, a secondary contents insertion unit 25, and a derived contents signature unit 26, and is connected to a secondary contents storage unit 80.

The secondary contents storage unit 80 stores secondary contents as shown in FIG. 9.

The original contents acquisition unit 21 acquires the original contents 131 added with an electronic signature from the original contents creation apparatus 10 through the network 40a or the storage medium 50a.

The secondary contents acquisition unit 22 acquires the secondary contents 221 to be inserted into the original contents 131 added with the electronic signature from the secondary contents storage unit 80. Here, when the original contents 131 added with the electronic signature are the metadata, the secondary contents to be inserted are also metadata describing the information of the media data. Note that, in the case of using the media data for the original contents, the secondary contents are also media data. This case is also realizable by applying a protection format similar to that of the first embodiment.

The limitation rule extraction unit 23 (limitation rule extracting means) extracts the secondary contents limitation rule 121 from the original contents 131 with the electronic signature, and inputs the rule concerned to the limitation rule evaluation unit 24. Moreover, the limitation rule extraction unit 23 extracts the first operation rule and the second operation rule from the original contents 131 added with the electronic signature, and inputs the rules concerned to the limitation rule evaluation unit 24.

The limitation rule evaluation unit 24 extracts the feature quantity of the secondary contents from the secondary contents 221, and determines whether or not the secondary contents 221 fit to the secondary contents limitation rule 121. When the secondary contents do not fit to the limitation rule, for example, the limitation rule evaluation unit 24 outputs a repudiation notice to the secondary contents insertion unit 25 according to the first operation rule, and makes the secondary contents insertion unit 25 stop processing for inserting the secondary contents 221 into the original contents 131 added with the electronic signature. Meanwhile, when the secondary contents fit to the limitation rule, for example, the limitation rule evaluation unit 24 issues a notice on permission to insert the secondary contents 221 into the original contents 131 added with the electronic signature to the secondary contents insertion unit 25 according to the second operation rule.

Upon receiving the notice on the insertion permission, the secondary contents insertion unit 25 (secondary contents inserting means) inserts the derived contents 221 into the original contents 131, and outputs derived contents 251 as shown in FIG. 10.

The derived contents signature unit 26 (derived contents signature means) gives the electronic signature to the derived contents 221, and outputs derived contents 261 added with the electronic signature, which are as shown in FIG. 11. Moreover, the derived contents signature unit 26 may give the electronic signature after describing a third operation rule that defines an operation of the case where an unauthorized deletion of the secondary contents has been detected and a fourth operation rule that defines an operation of the case where the unauthorized deletion of the secondary contents has not been detected.

Note that, though not essential, it is also possible for each of the limitation rule extraction unit 23 and the limitation rule evaluation unit 24 to include an appropriate protection mechanism for the purpose of protecting the contents from an unauthorized intervention by a malicious person or program.

For example, the above-described processing is performed by a server apparatus physically isolated from an outsider, thus making it possible to protect the contents from the malicious outsider. Moreover, communications between a memory to be used by the respective processing units and the respective processing units are protected by means of an encryption technology, thus making it possible to protect the contents from the malicious program such as a worm and a virus.

Moreover, such a configuration is also possible, in which the limitation rule extraction unit 23 and the limitation rule evaluation unit 24 are arranged in another server apparatus protected appropriately. In this case, it is necessary to protect a connection between this server apparatus and the derived contents creation apparatus 20 by means of the encryption technology.

Figure 8:
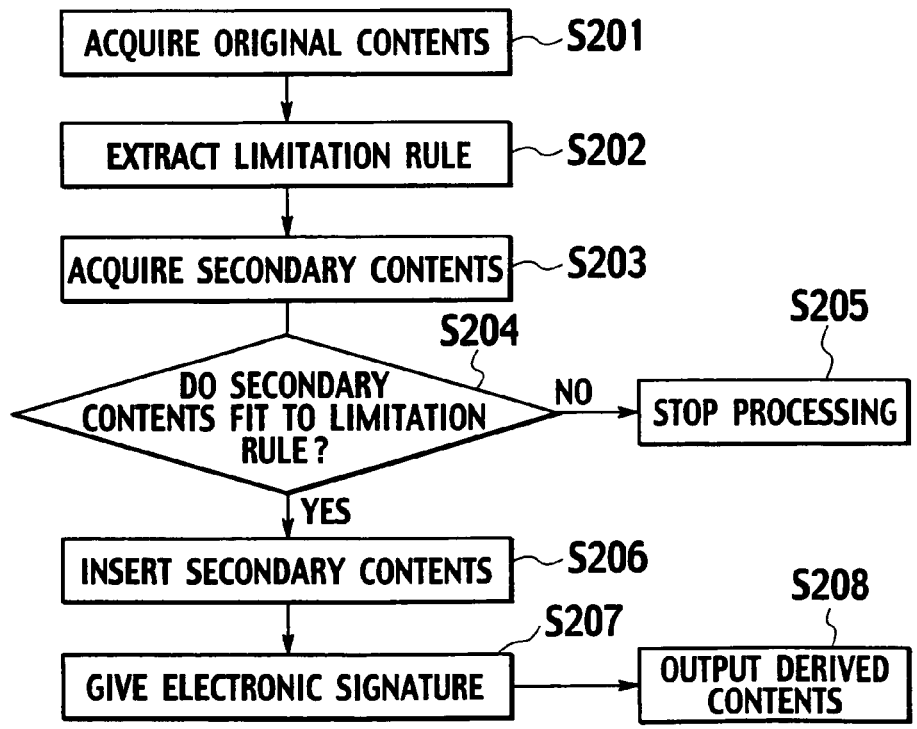
FIG. 8 is a flowchart showing a derived contents creation method according to the first embodiment.

Next, a derived contents creation method will be described by using FIG. 8.

(A) First, in Step S201, the original contents acquisition unit 21 acquires the original contents 131 added with the electronic signature from the original contents creation apparatus 10 through the network 40a or the storage medium 50a. Then, in Step S202, the limitation rule extraction unit 23 extracts the secondary contents limitation rule 121, the first operation rule and the second operation rule from the original contents 131 added with the electronic signature, and inputs the rules concerned to the limitation rule evaluation unit 24.

(B) Meanwhile, in Step S203, the secondary contents acquisition unit 22 acquires the secondary contents 221 from the secondary contents storage unit 80.

(C) In Step S204, the limitation rule evaluation unit 24 extracts the feature quantity of the secondary contents from the acquired secondary contents 221, and determines whether or not the secondary contents fit to the secondary contents limitation rule 121. When the secondary contents do not fit to the limitation rule, the processing proceeds to Step S205, where, for example, the limitation rule evaluation unit 24 outputs the repudiation notice to the secondary contents insertion unit 25 according to the first operation rule, and makes the secondary contents insertion unit 25 stop the processing for inserting the secondary contents 221 into the original contents 131 added with the electronic signature. Meanwhile, when the secondary contents fit to the limitation rule, the processing proceeds to Step S206, where, for example, the limitation rule evaluation unit 24 issues the notice on permission to insert the secondary contents 221 into the original contents 131 added with the electronic signature to the secondary contents insertion unit 25 according to the second operation rule.

(D) In Step S206, the secondary contents insertion unit 25 inserts the secondary contents 221 into the original contents 131, and outputs the derived contents 261.

(E) Next, in Step S207, the derived contents signature unit 26 gives the electronic signature to the derived contents 221. For example, as shown in FIG. 11, the derived contents signature unit 26 gives a hash value of the original contents to the derived contents, and gives a signature value and verification key information of the derived contents creation apparatus.

(F) Then, the derived contents signature unit 26 outputs the derived contents 261 added with the electronic signature. The outputted derived contents 261 added with the electronic signature are transmitted to the derived contents replay apparatus 30.

Note that, in Step S207, as shown in FIG. 12, the derived contents signature unit 26 may give the electronic signature after describing the third operation rule that defines the operation of the case where the unauthorized deletion of the secondary contents has been detected and the fourth operation rule that defines the operation of the case where the unauthorized deletion of the secondary contents has not been detected.

(Derived Contents Replay Apparatus and Method)

As shown in FIG. 13, the derived contents replay apparatus 30 includes a derived contents acquisition unit 31, an original contents signature verification unit 32, a derived contents signature verification unit 33, a limitation rule evaluation unit 34, and a derived contents replay processing unit 35.

The derived contents acquisition unit 31 acquires the derived contents 261 added with the electronic signature from the derived contents creation apparatus 20 through the network 40b or the storage medium 50b.

The original contents signature verification unit 32 removes the secondary contents from the derived contents 261 added with the electronic signature, verifies the electronic signature given by the original contents creation apparatus 10, and issues a notice on a verification result to the derived contents replay processing unit 35.

The derived contents signature verification unit 33 verifies the electronic signature given by the derived contents creation apparatus 20, and issues a notice on a verification result to the derived contents replay processing unit 35.

The limitation rule evaluation unit 34 determines whether or not the secondary contents 221 contained in the derived contents 261 meet the secondary contents limitation rule 121, and issues a notice on a result thereof to the derived contents replay processing unit 35.

The derived contents replay processing unit 35 (derived contents using means) performs derived contents replay processing based on the respective results of the signature verifications and the evaluation result of the limitation rule.

Specifically, when at least any one of the results of the signature verifications is a failure, the derived contents replay processing unit 35 stops the replay processing immediately, and outputs an appropriate error message. Moreover, when the secondary contents do not fit to the limitation rule, for example, the derived contents replay processing unit 35 stops the replay processing immediately according to the first operation rule contained in the derived contents 261, and outputs an appropriate error message.

Meanwhile, when both results of the signature verifications are successes, and the secondary contents fit to the limitation rule, for example, the derived contents replay processing unit 35 performs the replay processing for the derived contents according to the second operation rule.

Note that, in the case of having received the derived contents 262 as shown in FIG. 12, in which the third operation rule and the fourth operation rule are contained, the derived contents replay apparatus 30 performs processing according to the third operation rule in the case of having detected the deletion of the secondary contents and according to the fourth operation rule in the case of not having detected the deletion of the secondary contents.

Moreover, since the derived contents 261 are metadata in the first embodiment, the derived contents replay processing unit 35 performs acquisition/replay processing of the media data according to the description in the metadata.

Moreover, it is necessary to protect the original contents signature verification unit 32, the derived contents signature verification unit 33, the limitation rule evaluation unit 34 and the derived contents replay processing unit 35 from the unauthorized intervention by the malicious person or program. The communications between the memory for use in the respective processing units and the respective processing units are protected by means of the encryption technology, thus making it possible to protect the contents from the malicious person or program.

Moreover, such a configuration is also possible, in which the above-described components are protected by being mounted on tamper-resistant hardware.

Next, a derived contents replay method will be described by using FIG. 14.

(A) First, in Step S201, the derived contents acquisition unit 31 acquires the derived contents 261 added with the electronic signature from the derived contents creation apparatus 20 through the network 40b or the storage medium 50b.

(B) Next, in Step S302, the original contents signature verification unit 32 verifies the electronic signature given by the original contents creation apparatus 10, and issues a notice on a result of the verification to the derived contents replay processing unit 35. In Step S303, the derived contents replay processing unit 35 determines whether or not the result of the signature verification is a success. When the result is a success, the processing proceeds to Step S305, and when the result is a failure, the processing proceeds to Step S304, where the replay processing is stopped immediately, and an appropriate error message is outputted.

(C) Next, in Step S305, the derived contents signature verification unit 33 verifies the electronic signature given by the derived contents creation apparatus 20, and issues a notice on a result of the verification to the derived contents replay processing unit 35. In Step S306, the derived contents replay processing unit 35 determines whether or not the result of the signature verification is a success. When the result is a success, the processing proceeds to Step S307, and when the result is a failure, the processing proceeds to Step S304, where the replay processing is stopped immediately, and an appropriate error message is outputted.

(D) Next, in Step S307, the derived contents replay processing unit 35 determines whether or not the secondary contents fit to the limitation rule. When the secondary contents do not fit to the limitation rule, the processing proceeds to Step S304, where, for example, the replay processing is stopped immediately according to the first operation rule contained in the derived contents 261, and an appropriate error message is outputted. Meanwhile, when the secondary contents fit to the limitation rule, the processing proceeds to Step S308, where, for example, the derived contents replay processing unit 35 performs the replay processing of the derived contents according to the second operation rule.

Moreover, the derived contents replay processing unit 35 may determine whether or not the deletion of the secondary contents has been detected, and may perform the processing according to the third operation rule contained in the derived contents 262 (refer to FIG. 12) when the deletion of the secondary contents has been detected, and according to the fourth operation rule contained in the derived contents 262 when the deletion of the secondary contents has not been detected.

Note that, in the flowchart of FIG. 14, the verification of the electronic signature given by the original contents creation apparatus (Step S302), the verification of the electronic signature given by the derived contents creation apparatus (Step S305), and the verification with respect to the limitation rule (S307), are performed in this order; however, the order is not limited to this, and these verifications may be performed in an arbitrary order. Moreover, the original contents signature verification unit 32 and the derived contents signature verification unit 33 may stop the other processing immediately in the case of failing in the correctness verification of the signature.

(Function and Effect)

In the derived contents distribution system according to the first embodiment, the limitation rule for the secondary contents is contained in the original contents, thus making it possible to certainly evaluate whether or not the secondary contents are pursuant to the limitation rule in addition to the correctness verification of the original contents in the derived contents creation apparatus 20.

Moreover, according to the derived contents distribution system in accordance with the first embodiment, the limitation rule can be contained in the signature of the original contents. In such a way, it is made possible to protect the limitation rule from the tamper and prevent the unauthorized use of contents.

Moreover, the original contents provider can define the operation in response to the detection result of the violation of the limitation rule, and accordingly, it is made possible to deal with the violation on the derived contents replay apparatus 30 side.

Moreover, according to the derived contents creation apparatus 20 in accordance with the first embodiment, it can be confirmed whether or not the secondary contents meet the limitation set by the original contents before the creation of the derived contents. Furthermore, the signature is given to the derived contents, thus making it possible to detect the tamper to the secondary contents.

Moreover, according to the derived contents replay apparatus 30 in accordance with the first embodiment, the origins and correctnesses of both of the original contents and the secondary contents can be verified. In the case of having received unauthorized contents or tampered contents, the replay can be stopped. Moreover, the original contents creation apparatus 10 performs the appropriate operation according to the operation rule designated by the original contents creation apparatus 10 in response to the verification result whether or not the secondary contents are pursuant to the limitation defined by the original contents creation apparatus 10. Hence, it is possible to protect the user of the contents from the unauthorized contents. Moreover, the unauthorized derived contents are prevented from being replayed, thus making it possible to protect the original contents.

Moreover, according to the original contents creation apparatus 10 in accordance with the first embodiment, the operation rule (first operation rule) that defines the operation of the case where the secondary contents violate the limitation rule can be contained in the original contents. In such a way, it is made possible to perform the appropriate operations in the derived contents creation apparatus 20 and the derived contents replay apparatus 30 when the secondary contents violate the limitation rule.

Moreover, according to the derived contents creation apparatus 20 in accordance with the first embodiment, the operation rule (third operation rule) that defines the operation in response to the detection result of the deletion of the secondary contents can be contained in the derived contents. In such a way, it is made possible to perform the appropriate operation when the derived contents replay apparatus 30 have detected the unauthorized deletion of the secondary contents.

Furthermore, according to the derived contents distribution system in accordance with the first embodiment, the first to fourth operation rules can be contained in the signature of the original contents. In such a way, it is made possible to protect the operation rules from the tamper. In addition, when the secondary contents violate the limitation, or when the secondary contents are deleted, the notice on the operation to be performed can be surely issued to the derived contents creation apparatus 20 or the derived contents replay apparatus 30.

Second Embodiment

In the second embodiment, description will be made of a derived contents distribution system, in which the original contents creation apparatus is capable of setting a secondary contents insertion place as a placeholder in advance, and the derived contents creation apparatus can request beforehand the placeholder into which the secondary contents are to be inserted.

(Derived Contents Distribution System)

Figure 15:
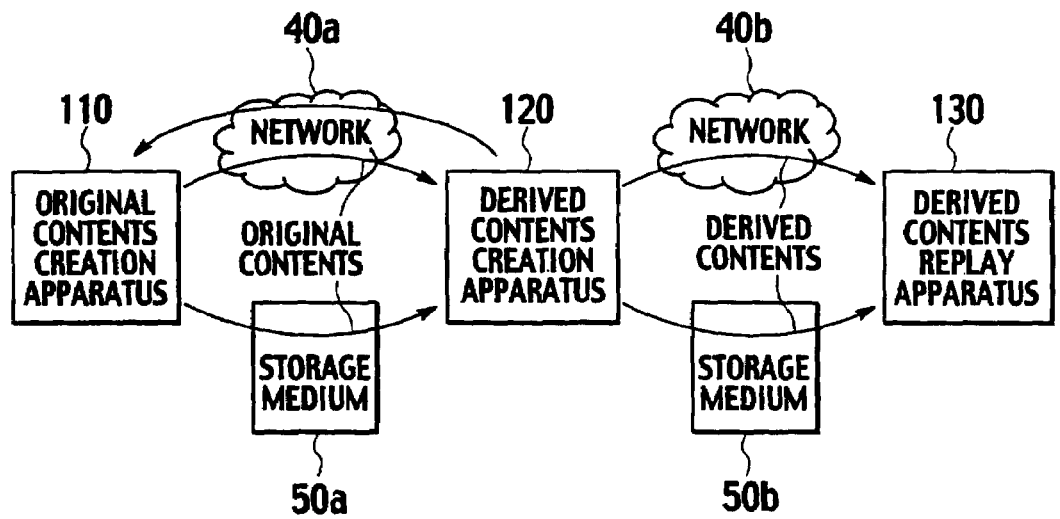
FIG. 15 is a configuration block diagram of a derived contents distribution system according to a second embodiment.

As shown in FIG. 15, the derived contents distribution system according to the second embodiment includes an original contents creation apparatus 110, a derived contents creation apparatus 120, and a derived contents replay apparatus 130. In this derived contents distribution system, in comparison with that in FIG. 1, added is a placeholder request for designating the insertion place of the secondary contents in the original contents, the placeholder request being transmitted from the derived contents creation apparatus 120 to the original contents creation apparatus 110.

Next, description will be made of detailed configurations and operations of the original contents creation apparatus 110, the derived contents creation apparatus 120 and the derived contents replay apparatus 130.

(Original Contents Creation Apparatus and Method)

Figure 16:
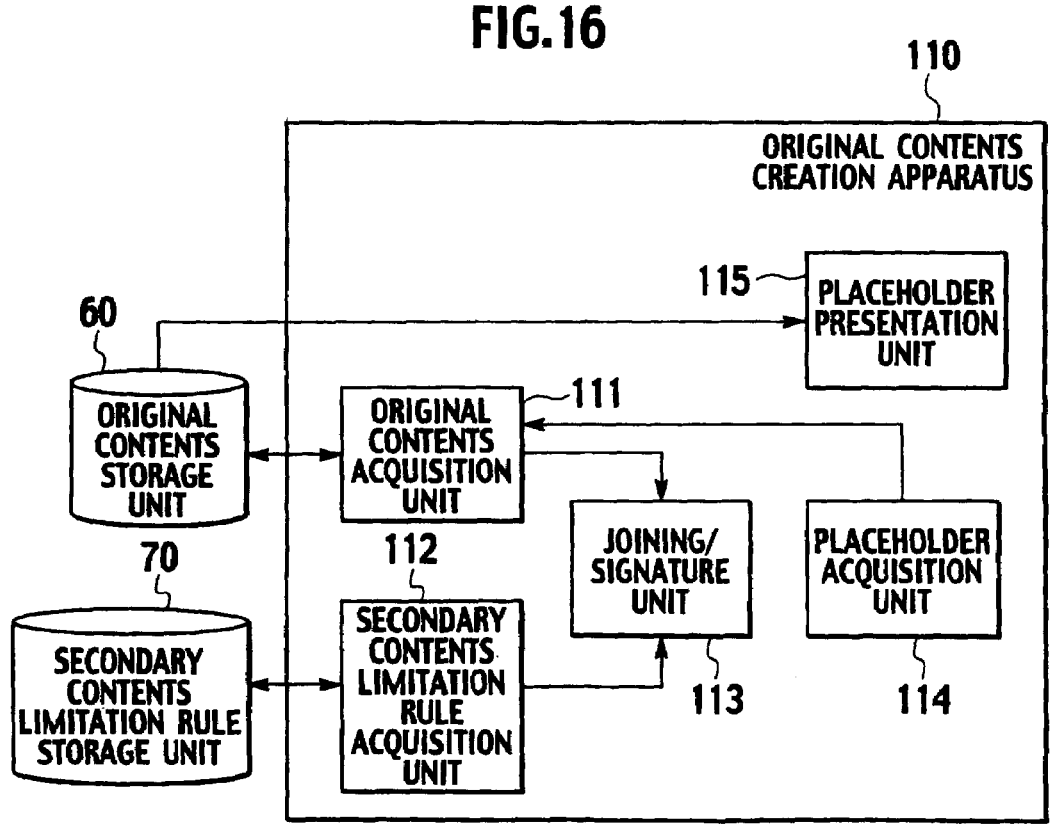
FIG. 16 is a configuration block diagram of an original contents creation apparatus according to the second embodiment.

As shown in FIG. 16, the original contents creation apparatus 110 includes an original contents acquisition unit 111, a secondary content limitation rule acquisition unit 112, a joining/signature unit 113, a placeholder request receiving unit 114, and a placeholder presentation unit 115, and is connected to the original contents storage unit 60 and the secondary contents limitation rule storage unit 70.

The placeholder request receiving unit 114 (receiving means) receives a placeholder request message from the derived contents creation apparatus 120. Then, the placeholder request receiving unit 114 extracts identification information of the placeholder and a parameter (hereinafter, referred to as a "derived contents correctness verification parameter") necessary to verify the correctness of the derived contents from the message. In the derived contents correctness verification parameter, a verification key of the electronic signature and identification information of a verification algorithm (hash algorithm, normalization algorithm, public-key algorithm or the like) are contained. Moreover, the placeholder request receiving unit 114 inputs the identification information of the placeholder to the original contents acquisition unit 111.

The original contents acquisition unit 111 acquires original contents 1111 (refer to FIG. 18) containing the placeholder concerned from the original contents storage unit 60.

The secondary contents limitation rule acquisition unit 112 acquires a limitation rule 1121 (refer to FIG. 19) from the secondary contents limitation rule storage unit 70. Moreover, the secondary contents limitation rule acquisition unit 112 acquires a first operation rule that defines an operation of the case where the secondary contents violate the limitation rule. Furthermore, the secondary contents limitation rule acquisition unit 112 acquires a second operation rule that defines an operation of the case of not having detected the insertion of the secondary contents violating the limitation rule.

The joining/signature unit 113 joins the original contents 1111 and the secondary contents limitation rule 1121 to each other, associates the placeholder identification information and the derived contents correctness verification parameter with each other to give the associated information and parameter to signature data, and then gives an electronic signature to the original contents 1111. Then, the joining/signature unit 113 outputs original contents 1131 added with the electronic signature (refer to FIG. 20). Note that FIG. 20 illustrates original contents which do not contain the second operation rule but only contain the first operation rule.

The placeholder presentation unit 115 presents a list of the placeholders contained in the original contents stored in the original contents storage unit 60 to the derived contents creation apparatus 120. Therefore, it is made possible for the derived contents creation apparatus 120 to select the placeholder from plural candidates.

Next, an original contents creation method will be described by using FIG. 17.

(A) First, in Step S401, the place holder request receiving unit 114 receives the placeholder request message from the derived contents creation apparatus 120. Then, in Step S402, the placeholder request receiving unit 114 extracts the identification information of the placeholder and the derived contents correctness verification parameter from the message. Moreover, the placeholder request receiving unit 114 inputs the identification information of the placeholder to the original contents acquisition unit 111.

(B) Next, in Step S403, the original contents acquisition unit 111 acquires the original contents containing the placeholder concerned from the original contents storage unit 60. Meanwhile, in Step S404, the secondary contents limitation rule acquisition unit 112 acquires the secondary contents limitation rule from the secondary contents limitation rule storage unit 70. Moreover, the secondary contents limitation rule acquisition unit 112 acquires the first operation rule that defines the operation of the case where the secondary contents violate the limitation rule.

(C) Next, in Step S405, the joining/signature unit 113 joins the original contents and the secondary contents limitation rule to each other. Specifically, as shown in FIG. 20, the joining/signature unit 113 continuously joins a smil element of the original contents 1111 and a Policy element of the limitation rule 121, and joins the first operation rule (Response element) thereto.

(D) Next, in Step S406, the joining/signature unit 113 gives the signature to the original contents thus joined. For example, as shown in FIG. 20, the joining/signature unit 113 gives hash values of the limitation rule, the first operation rule and the metadata (original contents) to the original contents, associates the placeholder identification information and the derived contents correctness verification parameter with each other to give the associated information and parameter to the signature data, and then gives a signature value and verification key information of the original contents creation apparatus.

(E) Then, in Step S407, the joining/signature unit 113 outputs the original contents added with the electronic signature. The outputted original contents added with the electronic signature are transmitted to the derived contents creation apparatus 120.

(Derived Contents Creation Apparatus and Method)

As shown in FIG. 21, the derived contents creation apparatus 120 includes an original contents acquisition unit 121, a secondary contents acquisition unit 122, a limitation rule extraction unit 123, a limitation rule evaluation unit 124, a secondary contents insertion unit 125, a derived contents signature unit 126, a placeholder request unit 127, a placeholder list acquisition unit 128, and a parameter storage unit 129, and is connected to the secondary contents storage unit 80.

The parameter storage unit 129 stores the derived contents correctness verification parameter.

The placeholder request unit 127 (transmission means) acquires the derived contents correctness verification parameter from the parameter storage unit 129, contains the parameter concerned in the placeholder request together with identification information of the requested placeholder, and transmits the placeholder request to the original contents creation apparatus 110. Moreover, the placeholder request unit 127 associates the above-described parameter with the above-described placeholder identification information, and stores the parameter concerned in the parameter storage unit 129. Note that, in the derived contents correctness verification parameter, a third operation rule by which the derived contents replay apparatus 130 is to abide when the unauthorized deletion of the secondary contents has been detected may be contained.

When the original contents creation apparatus 110 publicly opens the list of the placeholders, the placeholder list acquisition unit 128 acquires the placeholder list from the original contents creation apparatus 110. For example, there is a method of acquiring the placeholder list from the original contents creation apparatus 110 by using HTTP.

The original contents acquisition unit 121 acquires the original contents 1131 (refer to FIG. 20) added with the electronic signature, which contain the placeholder, from the original contents creation apparatus 10 through the network 40a or the storage medium 50a.

The secondary contents acquisition unit 122 acquires secondary contents 1221 (refer to FIG. 23) inserted into the original contents 1131 added with the electronic signature from the secondary contents storage unit 80, and inputs the secondary contents 1221 to the limitation rule evaluation unit 124.

The limitation rule extraction unit 123 extracts the secondary contents limitation rule 1121 from the original contents 1131 added with the electronic signature, and inputs the extracted secondary contents limitation rule 1121 to the limitation rule evaluation unit 124. Moreover, the limitation rule extraction unit 123 extracts the first operation rule from the original contents 1131 added with the electronic signature, and inputs the extracted first operation rule to the limitation rule evaluation unit 124.

The limitation rule evaluation unit 124 extracts the feature quantity of the secondary contents 1221 therefrom, and determines whether or not the secondary contents 1221 fit to the secondary contents limitation rule 1121. When the secondary contents do not fit to the limitation rule, for example, the limitation rule evaluation unit 124 outputs a repudiation notice to the secondary contents insertion unit 125 according to the first operation rule, and makes the secondary contents insertion unit 125 stop the processing for inserting the secondary contents 1221 into the original contents 1131 added with the electronic signature. Meanwhile, when the secondary contents fit to the limitation rule, for example, the limitation rule evaluation unit 124 issues a notice on permission to insert the secondary contents 1221 into the original contents 1131 added with the electronic signature to the secondary contents insertion unit 125 according to the second operation rule.

Upon receiving the notice on the insertion permission, the secondary contents insertion unit 125 inserts the secondary contents 1221 into the designated placeholder, and outputs derived contents 1251 (refer to FIG. 24).

The derived contents signature unit 126 acquires a correctness verification parameter of the derived contents corresponding to the identification information of the placeholder from the parameter storage unit 129, and gives an electronic signature to the derived contents 1251 by signature means corresponding to the parameter concerned. For example, when a signature verification key, a hash algorithm, a normalized algorithm and a signature algorithm are contained in the parameter, the derived contents signature unit 126 gives the electronic signature by means of a signature key and an algorithm which correspond thereto. Then, the derived contents signature unit 126 outputs derived contents 1261 (refer to FIG. 25) added with the electronic signature.

Figures 22, 23:
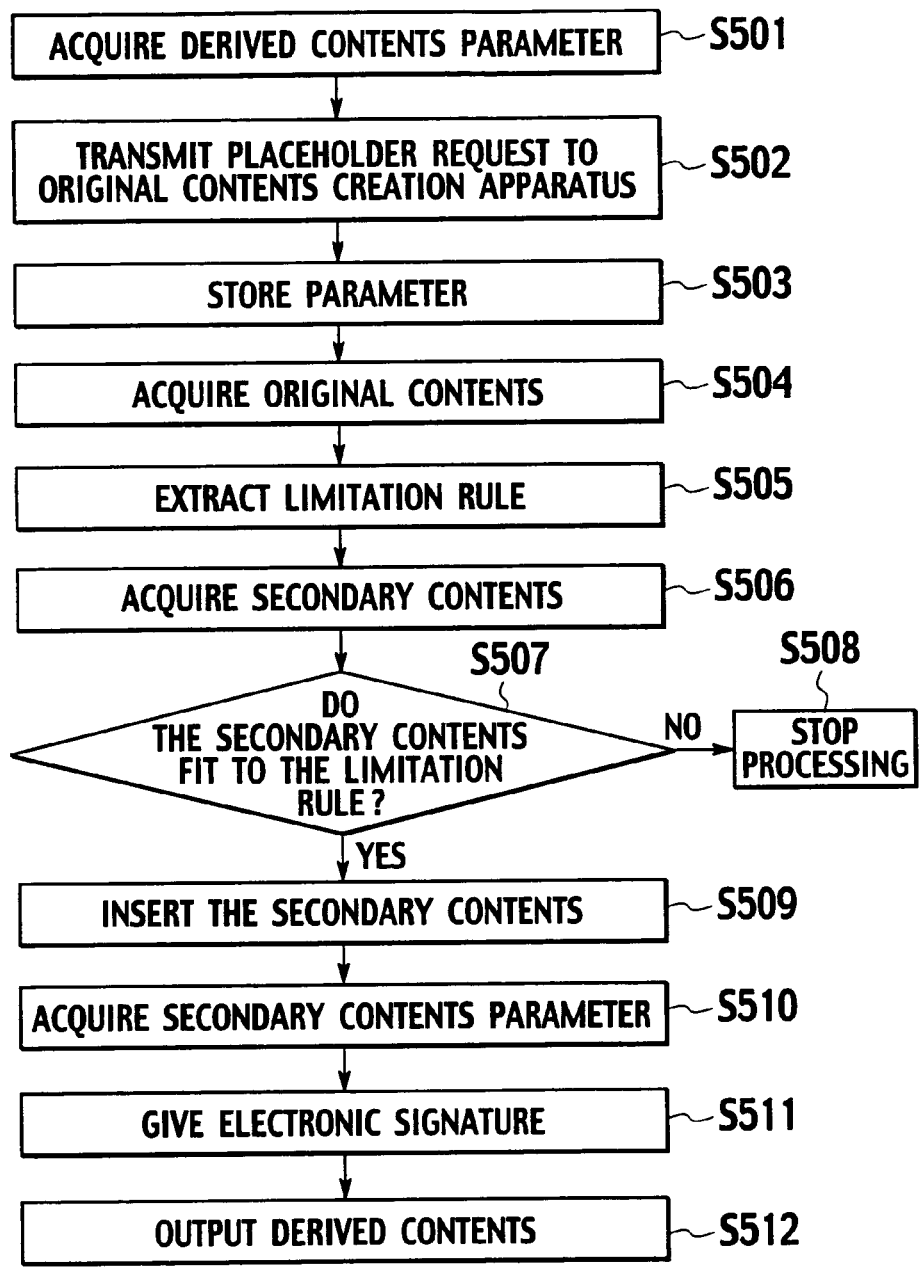
FIG. 22 is a flowchart showing a derived contents creation method according to the second embodiment.
FIG. 23 is an example of secondary contents according to the second embodiment.

Next, a derived contents creation method will be described by using FIG. 22.

(A) First, in Step S501, the placeholder request unit 127 acquires the derived contents correctness verification parameter from the parameter storage unit 129. Then, in Step S502, the placeholder request unit 127 contains the identification information of the placeholder in the placeholder request, and transmits the placeholder request containing the identification information to the original contents creation apparatus 110.

(B) Moreover, in Step S503, the placeholder request unit 127 associates the above-described parameter with the above-described placeholder identification information, and stores the associated parameter and identification information in the parameter storage unit 129.

(C) Next, in Step S504, the original contents acquisition unit 121 acquires the original contents 1131 (refer to FIG. 20) added with the electronic signature, which contains the placeholder, from the original contents creation apparatus 110 through the network 40*a* or the storage medium 50*a*. Then, in Step S505, the limitation rule extraction unit 123 extracts the secondary contents limitation rule 1121 and the first operation rule from the original contents 1131 added with the electronic signature, and inputs the extracted secondary contents limitation rule 1121 and first operation rule to the limitation rule evaluation unit 124.

(D) Meanwhile, in Step S505, the secondary contents acquisition unit 122 acquires the secondary contents 1221 (refer to FIG. 23) from the secondary contents storage unit 80.

(E) Next, in Step S507, the limitation rule evaluation unit 124 extracts the feature quantity of the secondary contents from the acquired secondary contents 1221, and determines whether or not the secondary contents fit to the secondary contents limitation rule 1121. When the secondary contents do not fit to the limitation rule, the processing proceeds to Step S508, where, for example, the limitation rule evaluation unit 124 outputs the repudiation notice to the secondary contents insertion unit 125 according to the first operation rule, and makes the secondary contents insertion unit 125 stop the processing for inserting the secondary contents 1221 into the original contents 1131 added with the electronic signature. Meanwhile, when the secondary contents fit to the limitation rule, the processing proceeds to Step S509, where, for example, the limitation rule evaluation unit 124 issues the notice on permission to insert the secondary contents 1221 into the original contents 1131 added with the electronic signature to the secondary contents insertion unit 125 according to the second operation rule.

(F) In Step S509, the secondary contents insertion unit 125 inserts the secondary contents 1221 into the designated placeholder, and outputs the derived contents 1251.

(G) Next, in Step S510, the derived contents signature unit 126 acquires the correctness verification parameter of the derived contents corresponding to the identification information of the placeholder concerned from the parameter storage unit 129. Then, in Step S511, the derived contents signature unit 126 gives the electronic signature to the derived contents 1251 by the signature means corresponding to the parameter concerned. For example, as shown in FIG. 25, the derived contents signature unit 126 gives the hash value of the original contents to the derived contents, and gives the signature value and the verification key information of the derived contents creation apparatus.

(H) Then, the derived contents signature unit 126 outputs the derived contents 1261 added with the electronic signature. The outputted derived contents 1261 added with the electronic signature are transmitted to the derived contents replay apparatus 130.

(Derived Contents Replay Apparatus and Method)

As shown in FIG. 26, the derived contents replay apparatus 130 includes a derived contents acquisition unit 131, an original contents signature verification unit 132, a derived contents signature verification unit 133, a limitation rule evaluation unit 134, and a derived contents replay processing unit 135.

The derived contents acquisition unit 131 acquires the derived contents 1261 added with the electronic signature from the derived contents creation apparatus 120 through the network 40*b* or the storage medium 50*b*.

The original contents signature verification unit 132 removes the secondary contents from the derived contents 1261 added with the electronic signature, verifies the electronic signature given by the original contents creation apparatus 110, and issues a notice on a result of the verification to the derived contents replay processing unit 135.

The derived contents signature verification unit 133 extracts the derived contents correctness verification parameter from the derived contents 1261 added with the electronic signature, verifies the electronic signature given by the derived contents creation apparatus 120 based on the parameter concerned, and issues a notice on a result of the verification to the derived contents replay processing unit 135.

The limitation rule evaluation unit 134 determines whether or not the secondary contents 1221 contained in the derived contents 1261 meet the secondary contents limitation rule 1121, and issues a notice on a result of the determination to the derived contents replay processing unit 135.

The derived contents replay processing unit 135 performs the derived contents replay processing based on the results of the respective signature verifications and the result of the limitation rule evaluation.

Specifically, when at least any one of the results of the signature verifications is a failure, the derived contents replay processing unit 135 stops the replay processing immediately, and outputs an appropriate error message. Moreover, when the secondary contents do not fit to the limitation rule, for example, the derived contents replay processing unit 135 stops the replay processing immediately according to the first operation rule contained in the derived contents 1261, and outputs an appropriate error message.

Meanwhile, when both results of the signature verifications are successes, and the secondary contents fit to the limitation rule, for example, the derived contents replay processing unit 135 performs the replay processing of the derived contents according to the second operation rule.

Note that, in the case of having received the derived contents 262 as shown in FIG. 12, which contain the third operation rule and the fourth operation rule, the derived contents replay apparatus 130 performs the processing according to the third operation rule in the case of having detected the deletion of the secondary contents and according to the fourth operation rule in the case of not having detected the deletion of the secondary contents.

Moreover, in the second embodiment, since the derived contents 1261 are metadata, the derived contents replay processing unit 135 performs acquisition/replay processing of the media data according to the description in the metadata.

Next, a derived contents replay method will be described by using FIG. 27.

(A) First, in Step S601, the derived contents acquisition unit 131 acquires the derived contents 1261 (refer to FIG. 25) added with the electronic signature from the derived contents creation apparatus 120 through the network 40*b* or the storage medium 50*b*.

(B) Next, in Step S602, the original contents signature verification unit 132 verifies the electronic signature given by the original contents creation apparatus 110, and issues a notice on a result of the verification to the derived contents replay processing unit 135. In Step S603, the derived contents replay processing unit 135 determines whether or not the result of the signature verification is a success. When the result is the success, the processing proceeds to Step S605, and when the result is a failure, the processing proceeds to Step S604, where the replay processing is stopped immediately, and an appropriate error message is outputted.

(C) Next, in Step S605, the derived contents signature verification unit 133 extracts the derived contents correctness verification parameter from the derived contents 1261 added with the electronic signature. Then, in Step S606, the derived contents signature verification unit 133 verifies the electronic signature given by the derived contents creation apparatus 120 based on the parameter concerned, and issues a notice on a result of the verification to the derived contents replay processing unit 135. In Step S607, the derived contents replay processing unit 135 determines whether or not the result of signature verification is a success. When the result is the success, the processing proceeds to Step S608, and when the result is a failure, the processing proceeds to Step S604, where the replay processing is stopped immediately, and an appropriate error message is outputted.

(D) Next, in Step S608, the derived contents replay processing unit 135 determines whether or not the secondary contents fit to the limitation rule. When the secondary contents do not fit to the limitation rule, the processing proceeds to Step S604, where, for example, the replay processing is stopped immediately according to the first operation rule contained in the derived contents 1261, and an appropriate error message is outputted. Meanwhile, when the secondary contents fit to the limitation rule, the processing proceeds to Step S609, where, for example, the derived contents replay processing unit 135 performs the replay processing of the derived contents according to the second operation rule.

Moreover, the derived contents replay processing unit 135 may determine whether or not the deletion of the secondary contents has been detected, and may perform the processing according to the third operation rule contained in the derived contents 262 (refer to FIG. 12) when the deletion of the secondary contents has been detected, and according to the fourth operation rule contained in the derived contents 262 when the deletion of the secondary contents has not been detected.

Note that, in the flowchart of FIG. 27, the verification of the electronic signature given by the original contents creation apparatus (Step S602), the verification of the electronic signature given by the derived contents creation apparatus (Step S606), and the verification with respect to the limitation rule (S607), are performed in this order; however, the order is not limited to this, and these verifications may be performed in an arbitrary order. Moreover, the original contents signature verification unit 132 and the derived contents signature verification unit 133 may stop the other processing immediately in the case of failing in the correctness verification of the signature.

(Function and Effect)

In the derived contents distribution system according to the second embodiment, the original contents creation apparatus 110 can explicitly designate the place into which the secondary contents are to be inserted. Therefore, it becomes easy for the original contents provider to control the insertion place of the secondary contents.

Moreover, the derived contents creation apparatus 120 can specify the insertion place of the secondary contents.

Furthermore, in the case of requesting the placeholder, the derived contents correctness verification parameter is notified to the original contents creation apparatus 110, and contained in the signature of the original contents, thus making it possible only for the derived contents creation apparatus 120 that has acquired the placeholder to insert the secondary contents.

Moreover, in the derived contents distribution system according to the second embodiment, the parameter necessary for the correctness verification of the derived contents can be received by the derived contents creation apparatus 120. Therefore, the parameter concerned can be prevented from being tampered after the derived contents are created.

Other Embodiments

Although the present invention has been described by the embodiments described above, it should not be understood that the descriptions and the drawings, which form a part of this disclosure, limit the invention. From this disclosure, various alternative embodiments, examples and operation technologies will be apparent to those skilled in the art.

For example, though the original contents creation apparatus, the derived contents creation apparatus and the derived contents replay apparatus have been described as apparatuses different from one another in the first and second embodiments, these apparatuses may be integrated into one apparatus.

Moreover, the original contents creation apparatus, the derived contents creation apparatus and the derived contents replay apparatus may include program holding units for holding control programs for allowing CPUs to execute the original contents creation processing, the derived contents creation processing and the derived contents replay processing, respectively. Each of the program holding units is, for example, a recording medium such as a RAM, a ROM, a hard disk, a flexible disk, a compact disc, an IC chip and a cassette tape. According to such a recording medium, storage, carriage, sale and the like of the control program can be performed easily.

Note that the original contents storage unit 60, the secondary contents limitation rule storage unit 70 and the secondary contents storage unit 80 and the like are recording media for storing information. The recording media include, for example, a RAM, a ROM, a hard disk, a flexible disk, a compact disc, an IC chip, a cassette tape and the like. According to such recording media, the storage, carriage, sale and the like of the information can be performed easily.

As described above, it is a matter of course that the present invention incorporates the various embodiments and the like, which are not described here. Hence, the technical scope of the present invention is defined only by items specifying the invention, which are according to the scope of claims reasonable based on the above description.

What is claimed is:

1. An original content creation apparatus configured to output original content, comprising:
    a memory configured to store the original content, the original content including audio or video data, or information used to access the audio or video data;
    a processing apparatus configured to communicatively interface with a derived content creation apparatus configured to generate derived content from the original content that is usable by a derived content replay apparatus;
    a limitation rule acquisition unit configured to acquire, from the memory, a limitation rule that indicates an attribute of secondary content that is permitted to be inserted into the original content;
    a joining unit configured to join the limitation rule and a first operation rule to the original content, the first operation rule defining an operation of the derived content creation apparatus or the derived content replay apparatus in response to a detection that an insertion of the secondary content violates the limitation rule;
    a signature unit configured to give an electronic signature to the original content to which the limitation rule and the first operation rule are joined, wherein
    the original content includes a placeholder designating an place for the secondary content to be inserted by the derived content creation apparatus; and
    a receiving unit configured to receive a placeholder request including identification information of the placeholder from the derived content creation apparatus.

2. The original content creation apparatus according to claim 1, wherein
    the receiving unit is further configured to receive a parameter from the derived content creation apparatus, the parameter being a verification key of the electronic signature and identification information of a verification algorithm, wherein the joining unit is configured to further join the parameter to the original content.

3. A derived content creation apparatus configured to insert secondary content into original content generated by an original content creation apparatus to thereby create derived content, comprising:
    a memory configured to store the original content, the original content including audio or video data, or information used to access the audio or video data;
    a processing apparatus configured to access the original content and to communicatively interface with the original content creation apparatus;
    a limitation rule extraction unit configured to extract a limitation rule from the original content that indicates an attribute of the secondary content that is permitted to be inserted into the original content;
    a secondary content insertion unit configured to generate the derived content by inserting the secondary content into the original content when the secondary content is determined to have the attribute of the limitation rule;
    a derived content signature unit configured to provide an electronic signature to the derived content; and
    a transmission unit configured to designate, to the original content, a placeholder for inserting the secondary content into the original content, and to transmit a placeholder request containing identification information of the placeholder to the original content creation apparatus,
    wherein the secondary content insertion unit inserts the secondary content into the placeholder.

4. The derived content creation apparatus according to claim 3, wherein
    the transmission unit is further configured to transmit, to the original content creation apparatus, a parameter being a verification key of the electronic signature and identification information of a verification algorithm, wherein the derived content signature unit gives the electronic signature by using an algorithm and a signature key which corresponds to the parameter.

5. A derived content replay apparatus configured to use derived content formed by inserting, at a derived content creation apparatus, secondary content into original content generated by an original content creation apparatus, the original content including audio or video data, or information used to access the audio or video data, comprising:
    a memory configured to store the derived content;
    a replay processing unit configured to replay the derived content;
    a verification unit configured to perform a first verification using a first electronic signature generated by the original content creation apparatus, which is included in the derived content, to perform a fitness process using a limitation rule generated by the original content creation apparatus, which is included in the derived content, the limitation rule indicating an attribute of the secondary content that is permitted to be inserted into the original content, and to perform a second verification using a second electronic signature inserted into the derived content by the derived content creation apparatus; and
    a derived content reproduction unit configured to decide processing of the derived content based on a result of the first verification result, a result of the second verification result, and a result of the fitness process;
    wherein the derived content reproduction unit is further configured to interrupt the replay processing when either the first verification result or the second verification result is a failure;
    process the derived content according to a first operation rule defining an operation in response to a detection that an insertion of the secondary content violates the limitation rule when the secondary content does not include the attribute of the limitation rule, the first operation rule being included in the original content; and
    replay the derived content when the first verification result and the second verification result are successful and the secondary content includes the attribute of the limitation rule.

* * * * *